United States Patent [19]
Luenser

[11] 4,211,098
[45] Jul. 8, 1980

[54] SOLID STATE CONTROL SYSTEM FOR MECHANICAL PRESS

[75] Inventor: Kurt K. Luenser, Desoto, Tex.

[73] Assignee: Verson Allsteel Press Company, Dallas, Tex.

[21] Appl. No.: 939,653

[22] Filed: Sep. 5, 1978

[51] Int. Cl.² .............................................. B21J 9/20
[52] U.S. Cl. ......................................... 72/21; 72/444; 192/131 R
[58] Field of Search ...................... 72/21, 444; 100/53; 192/131 R, 131 H

[56] References Cited

U.S. PATENT DOCUMENTS

| | | | |
|---|---|---|---|
| 3,628,357 | 12/1971 | Luenser | 100/53 |
| 3,666,965 | 5/1972 | Luenser | 307/112 |
| 3,730,313 | 5/1973 | Luenser | 100/53 |
| 3,749,005 | 7/1973 | Einecker et al. | 192/131 R |
| 3,887,052 | 6/1975 | DelFaro et al. | 192/131 R |
| 3,889,503 | 6/1975 | Luenser | 100/53 |
| 3,931,727 | 1/1976 | Luenser | 72/444 |
| 4,063,627 | 12/1977 | Wright | 192/131 R |
| 4,113,079 | 9/1978 | Wright | 100/53 |

*Primary Examiner*—Lowell A. Larson
*Attorney, Agent, or Firm*—Richards, Harris & Medlock

[57] ABSTRACT

The application discloses a control system for a mechanical press in which two separate control circuits must simultaneously produce control signals to operate the ram through its ram cycle. If either of the control circuits produces a spurious output or intermediate signal or fails to produce a proper output or intermediate signal, circuitry will detect such occurrences and stop or prevent operation of the ram. A plurality of checking circuits constantly monitor input signals, intermediate signals, and output signals to insure that the press is not activated by spurious signals. A circuit is provided to allow the run buttons to be used to initiate an upstroke of the ram of the press, and an indicator transmits information to the operator of the press to indicate operational status of the press.

42 Claims, 14 Drawing Figures

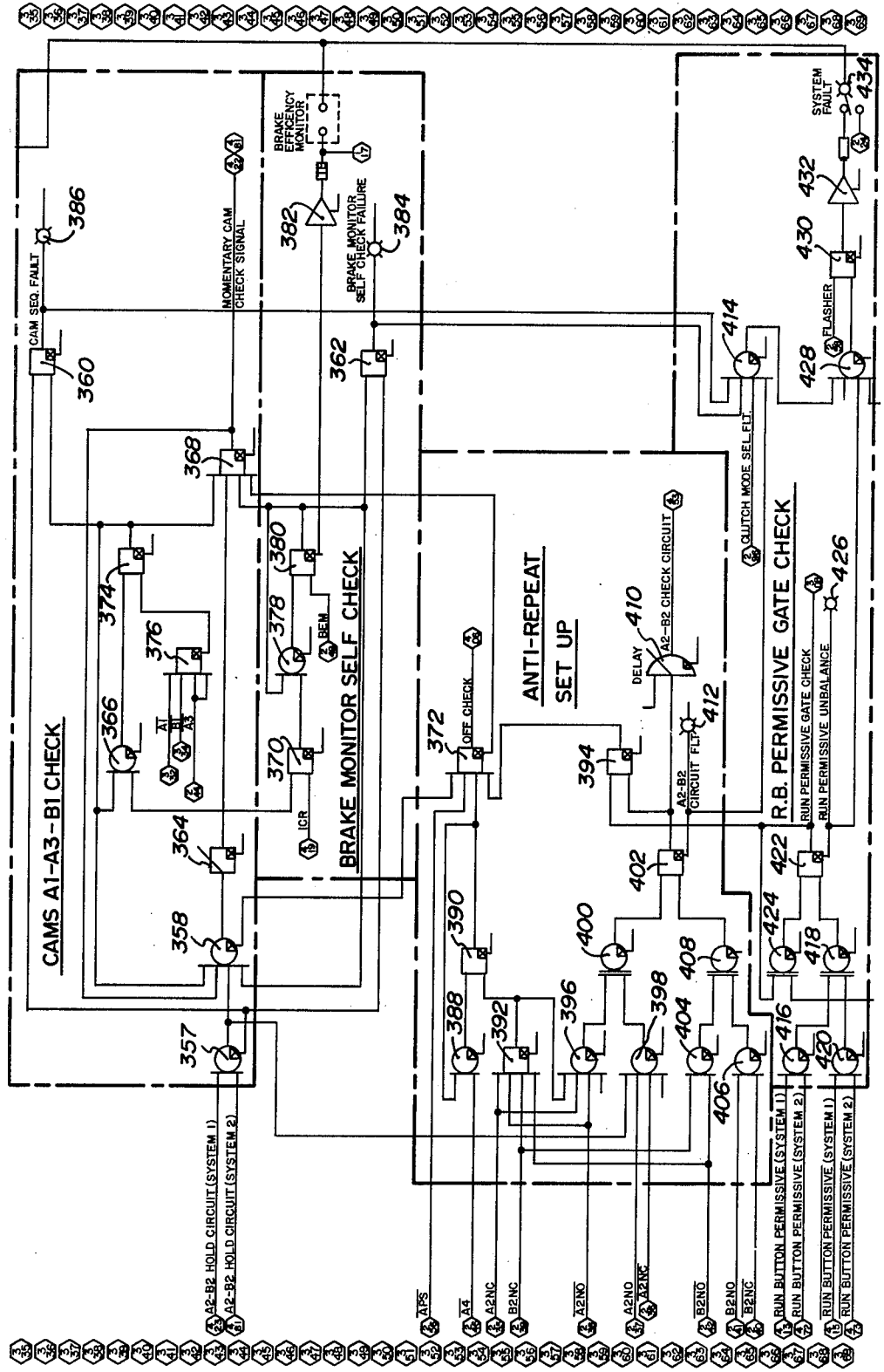

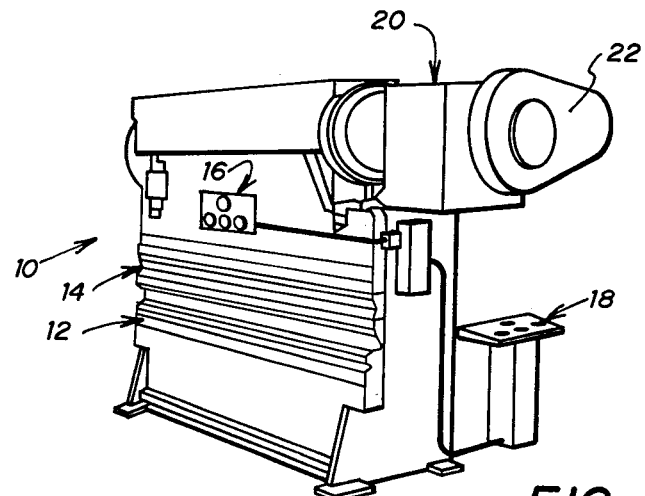
FIG. 5
| CAM | DEGREES | | | | | | | | | | | | DEGREES OF OPERATION |
|---|---|---|---|---|---|---|---|---|---|---|---|---|---|
| | 30° | 60° | 90° | 120° | 150° | 180° | 210° | 240° | 270° | 300° | 330° | 360° | |
| CLSA-1 | | | | | | | | ▨ | ▨ | | | | 240° – 300° |
| CLSA-2 | | | | | | ▨ | ▨ | ▨ | ▨ | ▨ | ▨ | | 180° – 330° |
| CLSA-3 | | | | | | | | ▨ | ▨ | | | | 200° – 260° |
| CLSA-4 | ▨ | ▨ | ▨ | ▨ | ▨ | ▨ | ▨ | ▨ | ▨ | ▨ | ▨ | | 30° – 330° |
| CLSB-1 | | | | | | | | ▨ | ▨ | ▨ | | | 240° – 330° |
| CLSB-2 | | | | | | ▨ | ▨ | ▨ | ▨ | ▨ | ▨ | | 180° – 330° |
FIG. 6
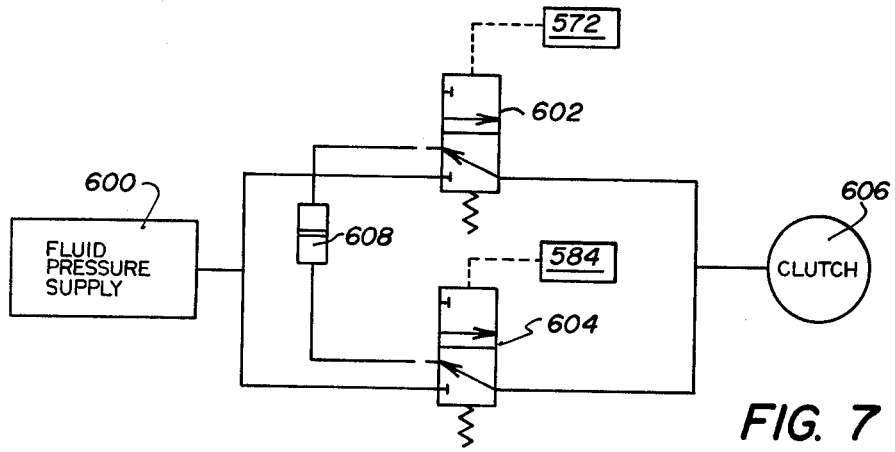
FIG. 7

SOLID STATE CONTROL SYSTEM FOR MECHANICAL PRESS

TECHNICAL FIELD

The present invention relates to a control system for a mechanical press, and particularly relates to a solid state control system having improved safety and performance characteristics.

BACKGROUND OF THE INVENTION

A primary concern in the design of a control system for a mechanical press is safety. A mechanical press typically has a reciprocating ram moving alternately towards and away from a die or mold piece. In most applications, such as in metal stamping, a powerful force is used to drive the ram towards the die. If the ram is inadvertently driven, a danger potential is created. Thus, it is important that the control system of a mechanical press does not fail in a manner causing the ram to be driven towards the die.

In the past, relay control circuits have been generally preferred over solid state control systems for mechanical presses. A relay physically breaks an electrical circuit with a reliable and reassuring airspace, whereas a solid state control system breaks or opens an electrical circuit by greatly increasing the resistivity of a simiconductor device. This functional distinction between relays and solid state control devices made it impractical to substitute solid state devices in a relay circuit.

The primary safety concerns with solid state control systems may be placed in two categories. First, there exists a possibility that the final output semiconductor device or devices that activate the ram may fail and inadvertently activate the ram. Second, there exists a possibility that an input solid state device or an intermediate solid state device may fail creating a spurious signal that would cause the final output solid state device or devices to activate the ram. Thus, a need has arisen for a solid state control system having a control circuit designed to substantially reduce the possibility that a failure of a final output device, an intermediary device, or an input device would cause the circuit to activate the ram.

Many prior mechanical presses have used inch buttons when the ram is stopped on an upstroke. In many mechanical presses, a number of operating stations are each provided with a pair of run buttons, but only one set of inch buttons are usually provided. To operate the ram of the mechanical press, all of the run buttons must be pressed in concert. However, in a typical mechanical press control system, the run buttons may be used to start the operation of the mechanical press only when the ram is in position for a downstroke. If the ram is stopped on the upstroke, generally, it was necessary to use the one set of inch buttons to bring the ram back to the top of its stroke in preparation for another downstroke.

If the run buttons on such mechanical presses are being used to operate the press, each operator must generally be pressing his buttons before the press will operate. However, if the inch buttons are used, only one operator is controlling the press, and a possibility exists that another operator will inadvertently be injured by the moving ram. Thus, a need has arisen for a control system for a mechanical press in which the run buttons may be used to bring the ram back to the top of the ram stroke after the ram has been stopped during the ram upstroke.

In many conventional control systems, the press is placed in a continuous mode of operation by pressing a continuous preset button and then pressing the run buttons within a selected time period after the continuous preset button is depressed. The run buttons must then be held in the depressed position until the ram reaches a selected position in the ram cycle. At this point, the run buttons may be released and the ram will continue to operate in the continuous mode until a stop signal is generated by some other means.

If the run buttons were not depressed within the selected time period after the continuous preset button was depressed, the ram would not operate. In such event, the operator could be confused as to the reason that the ram was not operating. Typically, such prior systems provide no indication of what fault prevented the operation of the ram. Also, when the condition preset button was depressed, the run buttons were depressed, and the ram began operation, typically, there is no clear indication to the operator of the point in time when the run buttons may be released without stopping the ram. Thus, a possibility exists that the operator will inadvertently release the run buttons too soon or will hold the run buttons in a depressed position for a needlessly long period of time. Thus, a need has arisen for indicators to transmit information to the operator to facilitate his operation of the press.

SUMMARY OF THE INVENTION

The present invention provides a solution to the foregoing and other problems associated with conventional control systems for mechanical presses. In the present invention, a plurality of checking circuits substantially improve safety of mechanical press control circuitry by constantly monitoring input signals, intermediate signals, and output signals to insure that the ram is not activated by spurious signals. If an illogical or spurious signal is detected, the operation of the press is either stopped or prevented.

The present invention provides two separate systems that must simultaneously produce signals to operate the ram through its ram cycle. If either of the systems produces a spurious output or intermediary signal or fails to produce a proper output or intermediate signal, circuitry will detect such occurrence and stop or prevent operation of the ram. The two separate systems do not provide mere redundancy, but each system is used to constantly check the other system.

Also, the present invention provides for the use of the run buttons to bring the ram back to the top of its stroke after the ram is stopped in an upstroke. Finally, indicator lamps transmit information to the operator to facilitate the operation of the press.

In accordance with the present invention, a control system is provided for a mechanical press. The mechanical press includes a drive system, a reciprocating ram selectively driven by the drive system and operating through a ram cycle, and a clutch for selectively engaging to mechanically connect the drive system to the ram. The control system includes input circuitry for producing a plurality of command signals. At least one clutch control system is responsive to the command signals for selectively producing a clutch engage signal, and at least one amplifier circuit is responsive to the clutch engage signal for producing energizing signals. The amplifier circuit includes first and second amplifiers and each of the first and second amplifiers produces an energizing signal when the clutch engage signal is produced. An actuator is responsive to both, but not one, of the energizing signals from the first and second amplifiers for engaging the clutch to operate the ram. Thus, the failure of one of the first or second amplifiers will not cause the clutch to engage.

In accordance with another aspect of the present invention, a control system is provided for mechanical press. The mechanical press includes a drive system, a reciprocating ram driven by the drive system and operating through a ram cycle, and a clutch for selectively engaging to mechanically connect the drive system to the ram. The control system includes an input circuit for producing a plurality of command signals. At least one clutch control system is responsive to the command signals for selectively producing at least one engage signal. A first amplifier circuit is responsive to the clutch engage signal for producing first energizing signals, and a second amplifier circuit is responsive to the clutch engage signal for producing second energizing signals. A first actuator is responsive to the first energizing signals and a second actuator is responsive to the second energizing signals for actuating and engaging the clutch in response to the simultaneous production of the first and second energizing signals. The failure of either of the first or second amplifier circuits or the first or second actuators will not cause the clutch to engage.

In accordance with another aspect of the present invention, a mechanical press includes a drive system, a reciprocating ram driven by the drive system and operating through a ram cycle, and a clutch for selectively engaging to mechanically connect the drive system to the ram. A control system includes an input circuit for producing a plurality of command signals. At least one clutch control system is responsive to the command signals for selectively producing at least one clutch engage signal. A first amplifier circuit is responsive to the clutch engage signal for producing first energizing signals, and a second amplifier circuit is responsive to the clutch engage signal for producing second energizing signals. A first valve system closes a first valve in response to the first energizing signals, and a second valve system closes a second valve in response to the second energizing signals. The clutch is connected to the first and second valve systems and is operable to engage in response to the simultaneous closing of the first and second valves.

In accordance with another aspect of the present invention, a control system for a mechanical press is provided. The mechanical press includes a drive system, a reciprocating ram driven by the drive system and operating through a ram cycle, and a clutch for selectively engaging to mechanically connect the drive system to the ram. The control system includes an input circuit for producing a plurality of command signals. A first clutch control system is responsive to the command signals for selectively producing a first clutch engage signal, and a second clutch control system is responsive to the command signals for selectively producing a second clutch engage signal. An output device is responsive to the first and second clutch engage signals for engaging the clutch when both the first and second engage signals are simultaneously produced.

In accordance with another aspect of the present invention, a control system for a mechanical press is provided. The mechanical press includes a drive system, a reciprocating ram driven by the drive system and operating through a ram cycle from 0° to 360° where 0° is defined as the top of the ram stroke and 180° is defined as the bottom of the ram stroke, a clutch for selectively engaging to mechanically connect the drive system to the ram, and first and second three way valves in a fluid pressure system for being actuated to simultaneously close to engage the clutch, the three way valves being interconnected so that if only one of the three way valves closes, the closed valve will exhaust fluid to atmosphere through the open valve and the ram will not operate.

The control system comprises an input circuit for producing a plurality of command signals. A first clutch control system is responsive to the command signals for selectively producing a first clutch engage signal, and a second clutch control system is responsive to the command signals for selectively producing a second engage signal. A first amplifier circuit is responsive to the simultaneous production of the first and second clutch engage signals for producing first energizing signals. A second amplifier circuit is responsive to the simultaneous production of the first and second clutch engage signals for producing second energizing signals. A first actuator is responsive to the first energizing signals to actuate the first valve, and a second actuator is responsive to the second energizing signals to actuate the second clutch valve so that the first and second clutch valves are simultaneously actuated to engage the clutch to initiate the operation of the ram.

In accordance with another aspect of the present invention, a control system is provided for a mechanical press. The mechanical press includes a drive system, a reciprocating ram driven by the drive system and operating through a ram cycle from 0° to 360° where 0° is defined as the top of the ram stroke and 180° is defined as the bottom of the ram stroke, a clutch for selectively engaging to mechanically connect the drive system to the ram, and first and second 3-way valves in a fluid pressure system for being actuated to simultaneously close to engage the clutch, the 3-way valves being interconnected so that if only one of the 3-way valves closes, the closed valve will exhaust fluid to atmosphere through the open valve and the ram will not operate.

The control system comprises an input circuit for producing a plurality of command signals, and a sensor for producing position signals corresponding to the position of the ram in the ram cycle. A first sub-clutch control circuit is responsive to at least the position signals for producing a first command permissive signal, and a second sub-clutch control circuit is responsive to at least the position signals for producing a second command permissive signal.

A first clutch engaging circuit is responsive at least to the command signals and the first command permissive signals for producing a first clutch engage signal, and a second clutch engaging circuit is responsive to at least the command signals and the second command permissive signals for generating a second clutch engage signal. An amplifier gate is responsive to the first and second clutch engaging signals to produce first and second amplifier gate signals. A first amplifier circuit is responsive to the first amplifier gate signals to produce first energizing signals, and a second amplifier circuit is responsive to the second amplifier gate signals to produce second energizing signals. First and second actuators close the first and second valves in response to the simultaneous production of the first and second energizing signals.

A command permissive check circuit is responsive to at least the first and second command permissive signals and produces a low fault signal in response to the production of one, but not both, of the first and second command permissive signals. An amplifier gate check circuit produces the low fault signal in response to the production of one, but not both, of the first and second amplifier gate signals. An amplifier check circuit produces the low fault signal when one, but not both, of the first and second energizing signals are produced; and a fault responsive means stops and prevents the operation of the reciprocating ram in response to the low fault signal.

In accordance with another aspect of the present invention, a control system is provided for a mechanical press having a drive system and a reciprocating ram for being selectively driven by the drive system through a ram cycle. The control system includes an input for being actuated, and a plurality of contacts responsive to the actuation of the input for producing a plurality of different command signals. A check circuit compares at least one command signal to another command signal to recognize a proper combination of command signals and produces a conditioned command signal when a proper plurality of command signals is recognized. A ram control circuit is responsive to at least the conditioned command signals and selectively causes the ram to be driven through the ram cycle. Thus, the ram operates through the ram cycle only when the check circuit recognizes a proper combination of command signals.

In accordance with another aspect of the present invention, a control system is provided for use in a mechanical press having a drive system and a reciprocating ram selectively driven by the drive system through a ram cycle. Run buttons are depressed to produce run signals and are released to terminate the run signals, and a preset button is depressed to produce a preset signal for a preselected time period. An enabling circuit produces a run buttons permissive signal in response to the termination of the run signals, and an initiating circuit is responsive to the run buttons permissive signal and the run signals for producing an initiating signal. A sustaining circuit is responsive to the preset signal and the run signals for producing a sustaining signal. An output circuit produces an operating signal in response to the initiating signal to operate the ram when the run buttons are in a depressed condition and produces an operating signal in response to the sustaining signal to operate the ram when the run buttons are in a released position.

An indicator produces a first indicator signal when the preset signal is produced, and produces a second indicator signal in response to the run button permissive signal indicating that the initiating means will operate the ram in response to the run signals. The second indicator signal is also produced in response to the operating signal and the absence of the sustaining signal to indicate that the ram will stop if the run buttons are released. The indicator produces a third indicator signal in response to the sustaining signal to indicate that the ram will continue to operate with the run buttons in a released condition. The third indicator signal is also produced in response to the absence of the run button permissive signal to indicate that the initiating means is disabled to prevent the production of the initiating signal and to indicate that the run buttons are inoperable to operate the ram.

BRIEF DESCRIPTION OF THE DRAWINGS

The advantages and further aspects of the present invention may be best understood by those of ordinary skill in the art by reference to the following Detailed Description when considered in conjunction with the Drawings in which:

FIGS. 3a, 3b & 3c disclose a circuit diagram of a portion of a mechanical press control circuit disclosing a plurality of check circuits for determining whether input and intermediary signals are proper;

FIG. 5 is a perspective view of a mechanical press;

FIG. 6 is a chart indicating the rotary cam limit switch sequence; and

FIG. 7 is a diagram of the fluid pressure circuit used to actuate a clutch to operate a mechanical press.

DETAILED DESCRIPTION

Figure 1A:
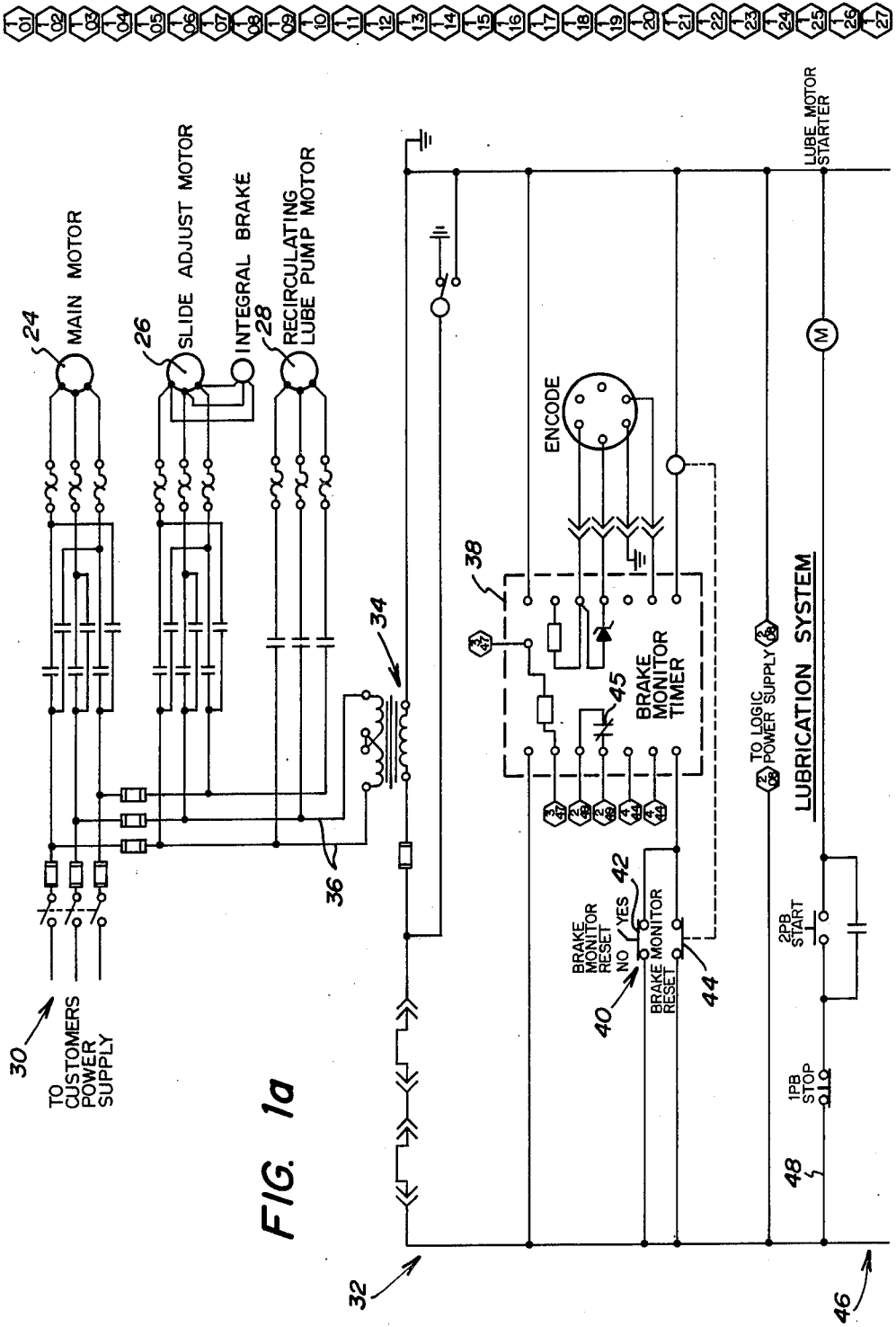
FIGS. 1a & 1b disclose a diagram of a circuit for controlling a main motor, a slide adjust motor and a recirculating lube pump motor.

Referring now to the drawings in which like referenced characters designate like or corresponding parts throughout several views, there is shown in FIG. 1 a motor control schematic diagram for a press, such as press 10 shown in FIG. 5. The press 10 of FIG. 5 includes a female mold 12 and a vertically reciprocating ram 14. The press 10 is shown with the ram 14 in its lowest position. In the up position of the ram 14, a sheet of metal may be inserted between the mold 12 and the ram 14. A control panel 16 is mounted on the front of the press 10, and a second control panel 18 is mounted to the side of the press 10. The control panels 16 and 18 include a plurality of buttons and indicator lights for operating the press 10. Each control panel 16 and 18 includes two spaced apart run buttons so that an operator must use two hands to depress the two run buttons in order to initiate the run operation of the press. The control panel 16 also includes inch buttons for controlling the operation of the ram 14.

Also shown in FIG. 5 is a transmission 20 and a flywheel cover 22 which encloses a motor driven flywheel which drives the ram 14. For a more detailed description of a typical metal stamping press transmission, reference is made to U.S. Pat. No. 3,498,424 and U.S. Pat. No. 3,686,967. The press 10 as shown in FIG. 5 is typical of metal presses suitable for use in conjunction with the present invention. It will be understood, however, that the present invention is capable of utilization in conjunction with presses having one, two or more control panels.

Figure 1B:
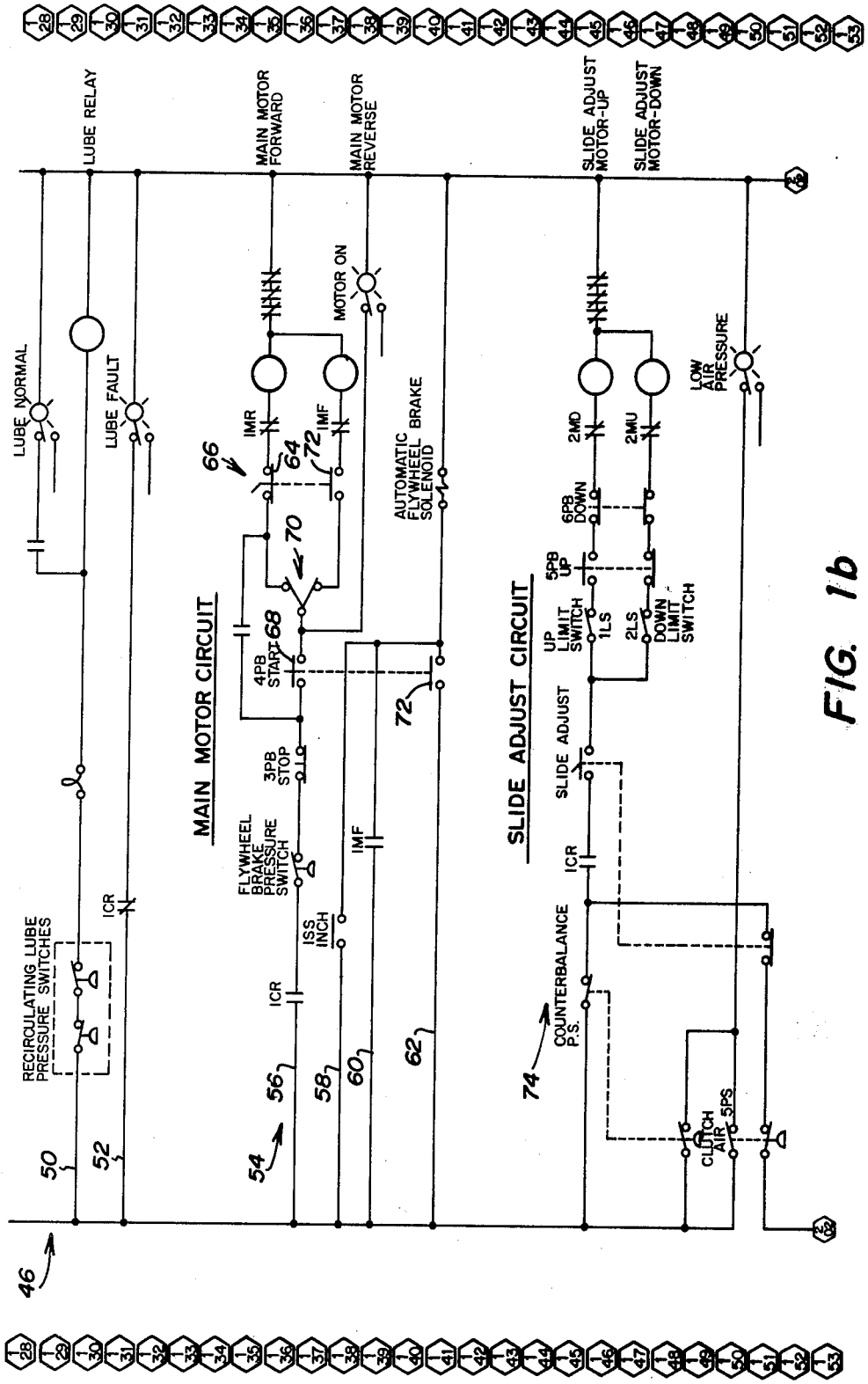

Referring now to FIG. 1, the entire figure is composed of FIGS. 1a and 1b positioned adjacently, 1a above 1b, so that the hexagons are in numerically ordered columns along either side of the figure. In FIG. 1, the motors 24, 26 and 28 are connected by lines 30 to a three phase power supply. A single phase power supply for the overall control circuit 32 is provided by a transformer 34 that is connected to the customer power supply through line 36.

A brake monitor timer 38 is connected to receive power from the transformer 34. For a more complete understanding and description of a brake monitor timer, such as timer 38, reference is made to U.S. Pat. No. 3,931,727. The brake monitor timer performs a timing function for monitoring the wear of a brake in the press 10. A brake monitor reset 40 consisting of a Yes-No switch 42 and normally closed button contacts 44 is connected between one terminal of the transformer 34 and the brake monitor 38. A normally closed contact 45 is connected between two terminals which are shown connected to two hexagons 2-49.

The brake monitor timer is interconnected with other portions of the motor control circuit 32 as indicated by the hexagons designated by the reference numbers 3-47, 2-49, 2-49, 4-44, and 4-44 which appear inside each of the hexagons. The top or first number is a single digit and refers to a number of a particular FIGURE. The bottom number refers to a particular line number on the FIGURE referenced by the top number. The vertical rows of hexagons extending along both sides of FIGS. 1-4 indicate the line reference numbers of the respective figures. To determine the electrical connection indicated by a hexagon, one must refer to the FIGURE number and line number indicated in a particular hexagon and search along the appropriately numbered line until a hexagon is located that refers back to the original figure at the appropriate line number. For instance, to determine the connection indicated by the hexagon having a reference number 3-47, one refers to FIG. 3 at line 47. Since the hexagon 3-47 is located on FIG. 1 at line 14, one searches on FIG. 3 along line 47 until a hexagon is found identified by the numerals 1-17. The hexagon identified as 3-47 on FIG. 1 may be visualized as being directly connected to the hexagon identified as 1-17 on FIG. 3. The abovedescribed reference technique will be used throughout FIGS. 1-4.

The hexagon 2-08 found on FIG. 1, line 24, indicates that power is supplied from the transformer 34 to the hexagons 1-24 on FIG. 2, line 08.

A lubrication system circuit is connected to the transformer 34 and includes lines 48, 50 and 52. On line 48, a stop switch 1PB is connected in series with a start switch 2PB, a relay 3M and contacts 3OL. A contact 3M is connected in parallel with the start switch 2PB. On line 50, a low pressure switch 1PS is connected in series with a high pressure switch 2PS which is connected in series with contact 1CR and indicator lamp 2LT. Relay 1CR is connected in series with the high pressure switch 2PS and in parallel with the series connection of the contact 1CR and the switch 2LT. On line 52, normally closed contact 1CR is connected in series with a lube fault indicator lamp 3LT.

A main motor circuit 54 includes lines 56, 58, 60 and 62. On line 56, contacts 1CR, a flywheel brake pressure switch 3PS, and a normally closed stop switch 3PB are connected in series. The stop switch 3PB is connected to contacts 1MF which is connected to normally closed contacts 64 of a forward-reverse switch 66. The contacts 64 are connected in series with contacts 1MR, relay 1MF and contacts 1OL. The stop switch 3PB is also connected to the normally open contact 68 of a start switch 4PB which is connected to an anti-plugging switch 70. The anti-plugging switch is movable between two electrical connections. The first connection being between the contacts 1MF and the normally closed contacts 64 of the forward reverse switch, and the second connection being between the start switch 68 and normally open contact 72 of the forward-reverse switch 66. The contacts 72 are connected to the series connection between contacts 1MF and relay 1MR. The relay 1MR is also connected to the junction between the relay 1MF and the contacts 1OL. An indicator lamp 4LT is connected between the power supply and the junction between the contacts 68 and the anti-plugging switch 70. On lines 58, 60 and 62 a parallel connection between inch switch 1SS, contacts 1MF and switch contacts 72 of the start switch 4PB is connected in series with an automatic flywheel brake solenoid 1 SOL.

A slide adjust circuit 74 includes a counterbalance switch 4PS, a clutch airswitch 5PS and a slide adjust on-off switch 4SS interconnected with an up limit switch 1LS and a down limit switch 2LS. These switches are connected to contacts of an up switch 5PB and a down switch 6PB which are interconnected with contacts 2MD and 2MU and relays 2MU and 2MD. One contact of the counterbalance switch 4PS, one contact of the slide adjust on-off switch 4SS and one contact of the clutch airswitch 5PS are in series with a hexagon 2-02 which is connected to a hexagon 1-52 on FIG. 2 line 2. Thus, the power supplied to hexagon 1-52 on FIG. 2, line 2 may be disconnected by switches 4PS, 4SS or 5PS.

Figure 2A:
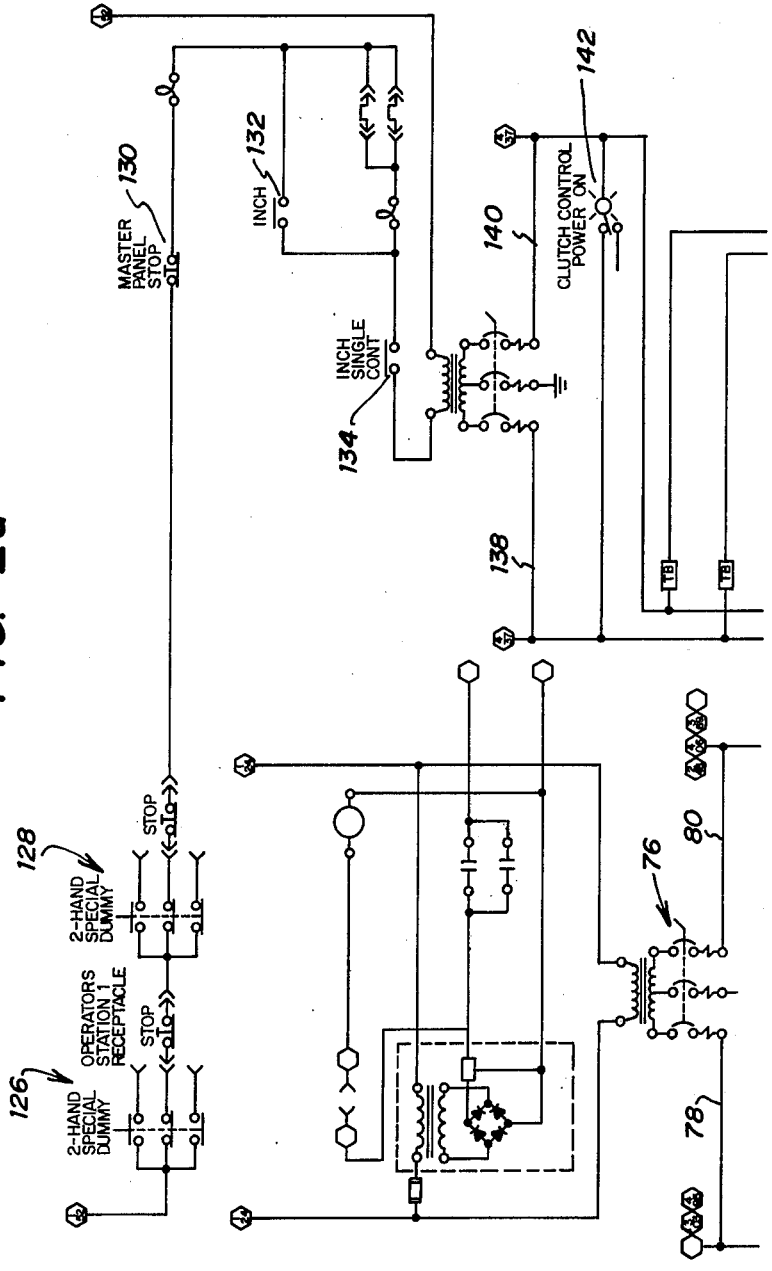
FIGS. 2a, 2b & 2c disclose a diagram of a portion of a control circuit for a mechanical press including input circuitry for rotary cam limit switches and a plurality of command buttons and switches.
Figure 2B:
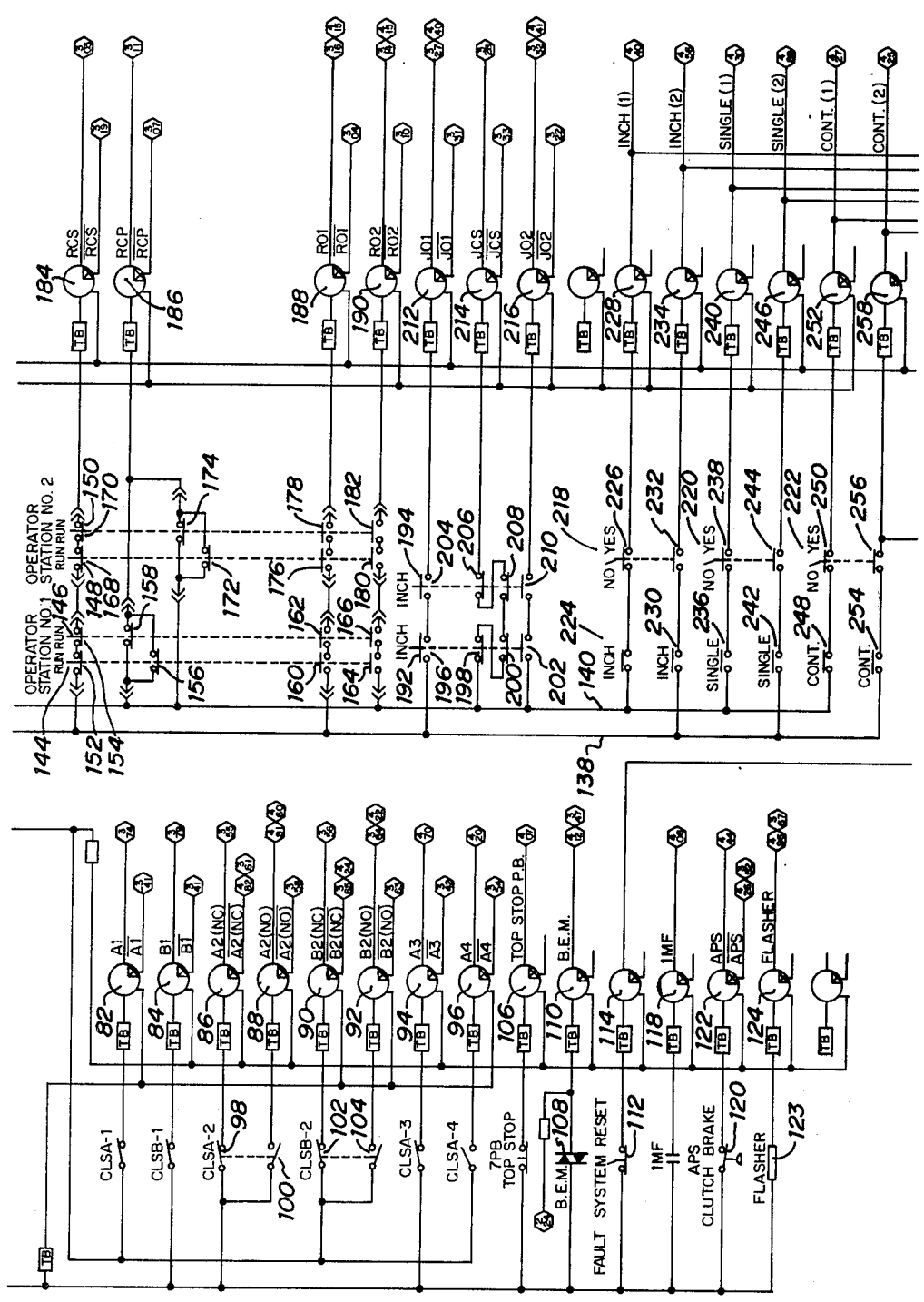
Figure 2C:
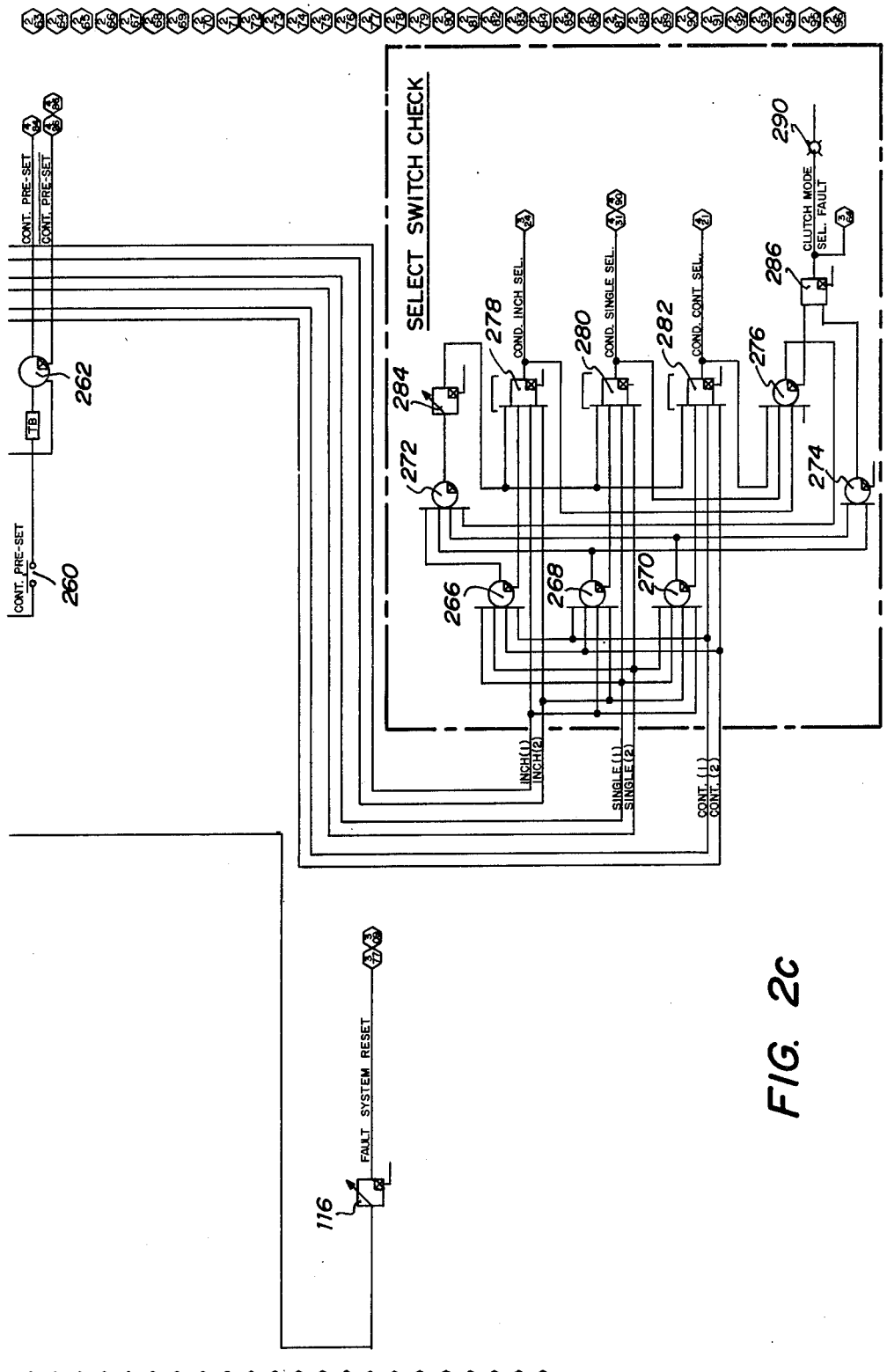

Referring now to FIG. 2, a schematic diagram is shown disclosing solid state control input units. The entire FIG. 2 may be formed by positioning FIGS. 2a, 2b and 2c adjacent with FIG. 2a positioned above FIG. 2b and FIG. 2c positioned below FIG. 2b. The hexagons indicating line numbers should form parallel vertical columns along both sides of the overall FIG. 2.

Referring now to FIG. 2 line 8 there is shown a pair of hexagons 1-24 on which the power supply is received. A center tapped, isolation transformer is connected to the power supply and provides power to the remainder of the control circuit. The transformer 76 has two output terminals 78 and 80 and the output coil of the transformer 76 is center tapped and grounded. Terminal 78 is connected to rotary cam limit switches CLSB-1, CLSA-2 and CLSA-3. Likewise, terminal 80 is connected to rotary cam limit switches CLSA-1, CLSB-2, and CLSA-4. The rotary cam limit switches are connected to inputs 82 through 96. Rotary cam limit switch CLSA-1 is connected to input 82 to produce the logic signals A1 and $\overline{A1}$. Switch CLSB-1 is connected to input 84 to produce the input signals B1 and $\overline{B1}$. CLSA-2 includes a normally closed contact 98 and a normally open contact 100. The normally closed contact 98 is connected to an input 86 to produce the signals A2(NC) and $\overline{A2(NC)}$. Contact 100 is connected to the input 88 to produce the signals A2(NO) and $\overline{A2(NO)}$.

The switch CLSB-2 includes a normally closed contact 102 and a normally open contact 104. Contact 102 is connected to the input 90 to produce the signals B2(NC) and $\overline{B2(NC)}$. The contact 104 is connected to the input 92 to produce the signals B2(NO) and $\overline{B2(NO)}$. The switch CLSA-3 is connected to the input 94 to produce the signals A3 and $\overline{A3}$. The switch CLSA-4 is connected to the input 96 to produce the signals A4 and $\overline{A4}$.

In accordance with standard usage, a signal designated without a bar over the signal designation is a TRUE signal and a signal having a bar over the signal is a NOT or inverted signal.

Each of the inputs 82 through 96 is also connected to either terminal 76 or 80 to receive power. Each input is connected to the opposite terminal from the limit switch to which the input is connected. For instance, since the limit switch CLSA-1 is connected to terminal 80, the input 82 is directly connected to the terminal 78. Likewise, since the limit switch CLSB-1 is connected to terminal 78, the input 84 is directly connected to the terminal 80.

Referring now to FIG. 2, line 47, a top stop switch 7PB is connected to an input 106 to produce a TOP STOP P.B. signal. A variac 108 is connected between the terminal 78 and an input 110 to produce a B.E.M. signal. A fault reset switch 112 is connected to an input 114 which is connected to a single shot 116 to produce a FAULT SYSTEM RESET signal. A relay contact 1MF is connected to an input 118 to produce a signal 1MF. A clutch brake pressure switch 120 is connected to an input 122 to produce signals APS and $\overline{APS}$ to indicate whether a clutch brake system is pressurized. Finally, a flasher 123 is connected to an input 124 to produce a flasher signal. The above-described and hereinafter described inputs may be any suitable solid state device but are preferably Westinghouse hex A.C. input NL-302. The single shot 116 and the single shots disclosed hereinafter are preferably Westinghouse dual adjustable single shots NL-350.

Referring now to FIG. 2 at line 2, a power supply is received at hexagons 1–52. Two selector switches 126 and 128 are connected in series at operator station 1 and operator station 2, respectively, for choosing whether to use a dummy, special, or 2-hand plug-in device at the operator stations 1 and 2. A master panel stop switch 130 is connected in series with the two switches 126 and 128, and the stop switch 130 is connected in series with inch contacts 132 and inch-single continuous contacts 134. Contacts 132 and 134 are part of an overall selector switch for selecting either an inch, single or continuous mode of operation. A transformer 136 is connected to the switch 134 at one terminal and to the power supply at the other terminal. The secondary terminals 138 and 140 supply power to the control circuit and the secondary coil of the transformer 136 is grounded so that the transformer 136 acts as an isolation transformer.

A clutch control power light 142 is connected between terminals 138 and 140 to indicate that the power is on. A pair of run buttons 144 and 146 are provided at operator station number 1 and another pair of run buttons 148 and 150 are provided at operator station number 2. Operator run buttons actuate the series contacts 152 and 154, the parallel contacts 156 and 158, the series contacts 160 and 162 and the series contacts 164 and 166. Likewise, the run buttons 148 and 150 actuate the series contacts 168 and 170, the parallel contacts 172 and 174, the series contacts 176 and 178, and the series contacts 180 and 182.

The series contacts 152 and 154 are connected in series with the series contacts 168 and 170 between the terminal 138 and an input 184 for producing a RCS signal and a $\overline{RCS}$ signal. RCS is an abbreviation for run button closed contacts in series. The parallel contacts 156 and 158 are connected and parallel with the parallel contacts 172 and 174 between the power terminal 140 and an input 186 for producing a RCP signal and a $\overline{RCP}$ signal. RCP is an abbreviation for run button closed contacts in parallel. The series contacts 160 and 162 are connected in series with the series contacts 176 and 178 between power terminal 138 and an input 188 for producing an RO1 signal and an $\overline{RO1}$ signal. RO1 is an abbreviation for run button open contacts number 1. The series contacts 164 and 166 are connected in series with the series contacts 180 and 182 between the power terminal 140 and an input 190 for producing an RO2 signal and a $\overline{RO2}$ signal. RO2 is an abbreviation for run buttons open contacts number 2.

A pair of inch buttons 192 and 194 are shown at FIG. 2, line 42. Inch button 192 actuates the normally open contacts 196, the normally closed contacts 198 and 200, and the normally open contacts 202. The inch button 194 actuates the normally open contacts 204, the normally closed contacts 206 and 208 and the normally open contacts 210. Contacts 196 and 204 are connected in series between power terminal 138 and an input 212 for producing a JO1 signal (inch button open contacts) and a $\overline{JO1}$ signal. The series contacts 198 and 200 are connected in series with the series contacts 206 and 208 between the power terminal 140 and an input 214 for producing a JCS signal (inch button closed contacts) and a $\overline{JCS}$ signal. The contacts 202 and 210 are connected in series between the power terminal 140 and an input 216 for producing a JO2 signal (inch button open contacts two) and a $\overline{JO2}$ signal.

Referring to FIG. 2 lines 50 through 61 there is symbolically shown an inch yes-no switch 218, a single yes-no switch 220 and a continuous yes-no switch 222. The yes-no switches 218, 220 and 222 may be located in a locked box so that a supervisor can lock-out a particular mode of operation by turning the appropriate switch to the no position. A normally open inch selector contact 224 is connected in series with an inch contact 226 between power terminal 140 and an input 228 to produce an INCH (1) signal. A normally open inch selector contact 230 is connected in series with an inch contact 232 between power terminal 138 and an input 234 for producing an inch (2) signal. A normally open single selector circuit 236 is connected in series with a single contact 238 between the power terminal 140 and an input 240 for producing a SINGLE (1) signal. A normally open single selector contact 242 is connected in series with a single contact 244 between power terminal 138 and an input 246 for producing a SINGLE (2) signal.

A continuous selector circuit 248 is connected in series with a continuous contact 250 between power terminal 140 and an input 252 for producing a CONTINUOUS (1) signal. A continuous selector contact 254 is connected in series with a continuous contact 256 between power terminal 138 and an input 258 for producing a CONTINUOUS (2) signal. A continuous preset contact 260 is connected in series with contacts 254 and 256 between the power terminal 138 and an input 262 for producing a CONTINUOUS PRESET signal and a $\overline{CONTINUOUS\ PRESET}$ signal.

The contacts 224, 230, 236, 242, 248 and 254 are all part of a selector switch for choosing either an inch, single or continuous mode of operations. The contacts 134 and 132 are also part of the selector switch.

Referring now to FIG. 2, lines 78 through 96, there is shown a select switch check circuit including OR gates 266, 268, 270, 272, 274 and 276, sealed AND gates 278, 280 and 282; a single shot 284; and an AND gate 286. The OR gates may be any suitable OR gates, such as a Westinghouse two input OR NL-341 or a Westinghouse four input OR NL-343. The sealed AND gate may be any suitable device, such as a Westinghouse 4-input sealed AND NL-343. The AND gates used in the present invention include both Westinghouse two input AND NL-342 gates and a Westinghouse four input AND NL-340 gate.

The INCH (1) signal and the INCH (2) signal are applied to the inputs of the sealed AND gate 278, the OR gate 268, and the OR gate 270. The SINGLE (1) SINGLE (2) signals are applied to the inputs of the OR gate 226, the OR gate 270 and, the sealed AND gate 280. The CONTINUOUS (1) CONTINUOUS (2) signals are applied to the inputs of the sealed AND gate 282, the OR gate 268, and the OR gate 266. The TRUE output of the OR gate 266 is applied to an input of the OR gate 272, while the NOT output of OR gate 266 is applied to an input of the sealed AND gate 278. The TRUE output of the OR gate 268 is applied to an input of the OR gate 272 and an input of the OR gate 274, and the NOT output of OR gate 268 is applied to an input of the sealed AND gate 280. The TRUE output of the OR gate 270 is applied to an input of the OR gate 272, an input of the OR gate 272, and an input of the OR gate 274; and the NOT output of OR gate 270 is applied to an input of the sealed AND gate 282. The TRUE output of the OR gate 272 is applied to a single shot 284 whose output is applied to the sealed inputs of the sealed AND gates 278, 280 and 282. The TRUE output of each of the sealed AND gates, 278, 280 and 282 are applied to three inputs of an OR gate 276. The TRUE output of the OR gate 276 is applied to an input of the OR gate 272. The NOT output of OR gate 276 is applied to one input of an AND gate 286, and the TRUE output of the OR gate 274 is applied to another input of the AND gate 286.

The TRUE output of the sealed AND gate 278 is a CONDITIONED INCH SELECT signal. The TRUE output of the sealed AND gate 280 is a CONDITION SINGLE SELECT signal. The TRUE output of the sealed AND gate 282 is a CONDITIONED CONTINUOUS SELECT signal.

Figure 3A:
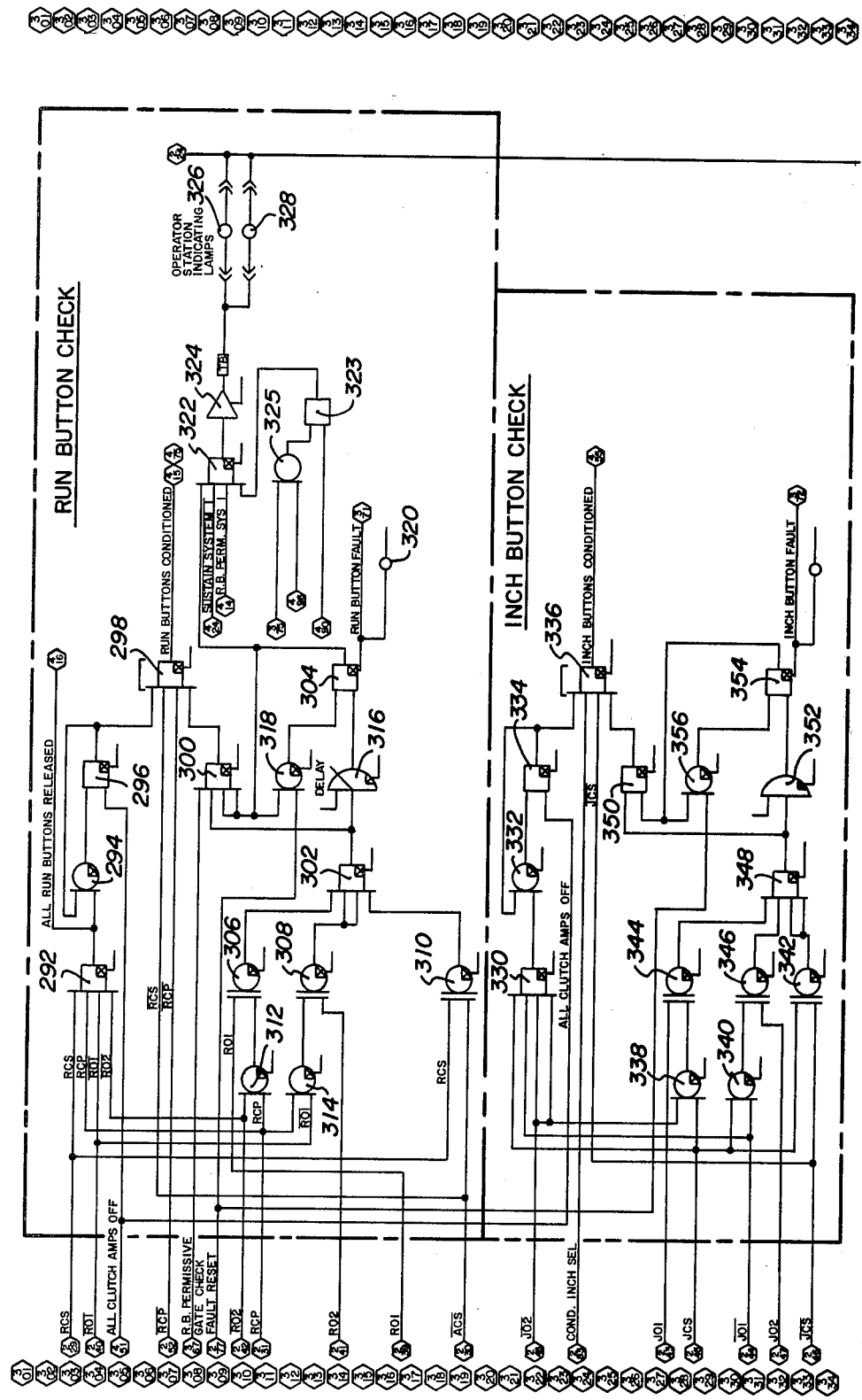
Figure 3C:
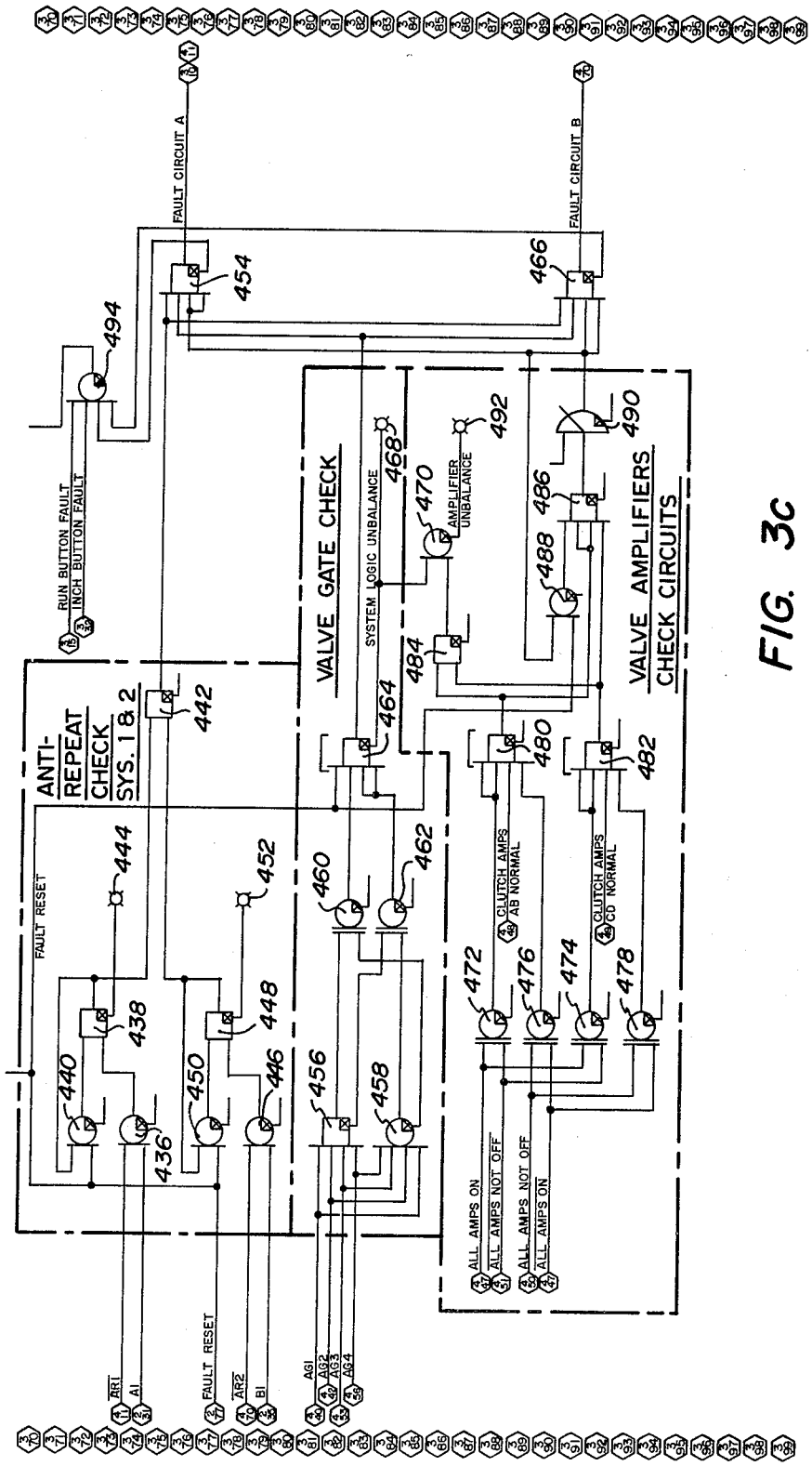

Referring now to FIG. 3, the overall FIG. 3 may be constructed by positioning FIGS. 3a, 3b and 3c adjacently to form a complete circuit. There should be two vertical columns of hexagons in numerical order along either side of FIG. 3 when FIGS. 3a, 3b and 3c are positioned properly. On FIG. 3 lines 1-19 there is shown a Run Button Check circuit in which an AND gate 292 receives the RCS signal, the RCP signal, the $\overline{RO1}$ signal and the $\overline{RO2}$ signal at its inputs. The TRUE output of the AND gate 292 is the ALL RUN BUTTONS RELEASED signal which is applied to an input of an OR gate 294. The ALL RUN BUTTONS RELEASED signal indicates that all of the run buttons were released and the signals RCS, RCP, $\overline{RO1}$ and $\overline{RO2}$ went high.

The TRUE output of OR gate 294 is applied to an input of the AND gate 296 and the TRUE output of AND gate 296 is applied to an input of the OR gate 294. An ALL CLUTCH AMPS OFF signal (hereinafter described) is applied to the other input of the AND gate 296.

The TRUE output of the AND gate 296 is applied to the sealed input of a sealed AND gate 298. The $\overline{RCS}$ signal and the $\overline{RCP}$ signal are also applied to inputs of the sealed AND gate 298. The TRUE output of an AND gate 300 is applied to the remaining input of the sealed AND gate 298, and the TRUE output of the sealed AND gate 298 is a RUN BUTTONS CONDITIONED signal.

A RUN BUTTONS PERMISSIVE GATE CHECK signal (hereinafter described) is applied to one input of the AND gate 300, and the outputs of AND gates 302 and 304 are applied to the remaining inputs of the AND gate 300. The inputs of the AND gate 302 are driven by the TRUE outputs of the exclusive OR gates 306, 308 and 310. The RO1 signal and the TRUE output of an OR gate 312 are applied to the inputs of the OR gate 306. The RO2 signal and the TRUE output signal of an OR gate 314 is applied to the inputs of the OR gate 308. The RCS and $\overline{RCS}$ signals are applied to the inputs of the OR gate 310. The $\overline{RO2}$ signal and the RCP signal are applied to the inputs of OR gate 312, and the RCP signal and the NOT 001 signal are applied to the inputs of the OR gate 314.

The TRUE output of the AND gate 302 is applied through a time delay 316 to an input of the AND gate 304. The other input of the AND gate 304 is connected to the TRUE output of an OR gate 318. The inputs of the OR gate 318 are connected to the TRUE output of the AND gate 304 and to a FAULT RESET signal.

The NOT output of the AND gate 304 is a RUN BUTTON FAULT signal that is applied to an LED 320 to indicate a fault. The TRUE output of the AND gate 304 is also applied as an input to an AND gate 322. The remaining inputs of the AND gate 322 are driven by a SUSTAINED SYSTEM 1 signal, a RUN BUTTON PERMISSIVE SYSTEM 1 signal and the TRUE output of an AND gate 323. The TRUE output of the AND gate 322 is connected to a dual AC output 324. Westinghouse dual AC output NL-321L has been found suitable for use throughout the invention. The signal from the dual output 324 drives indicator lamps 326 and 328 located at operator stations 1 and 2, respectively.

The inputs of the AND gate 323 are connected to the TRUE output of an OR gate 325 and to the FAULT CIRCUIT A signal. The inputs of the OR gate 325 are connected to the TRUE output of the AND gate 542(2) located at FIG. 4, line 97 and to the TRUE output of the AND gate 536(2) located at FIG. 4, line 90.

Referring to FIG. 3, lines 21-34, there is shown an Inch Button Check circuit in which the JCS signal and the $\overline{JL1}$ signal are applied to two inputs of an AND gate 330, and the remaining two inputs receive the $\overline{JO2}$ signal. The TRUE output of AND gate 330 is connected to an input of an OR gate 332, and the TRUE output of OR gate 332 is applied to an input of an AND gate 334. An ALL CLUTCH AMPS OFF signal (hereinafter described) is applied to the other input of AND gate 334, and the TRUE output of AND gate 334 is applied to an input of OR gate 332 and a sealed input of a sealed AND gate 336. The CONDITIONED INCH SELECT signal and the $\overline{JCS}$ signal are also applied to a pair of inputs on the sealed AND gate 336.

Referring now to FIG. 3, lines 28-33, the $\overline{JO2}$ signal and the JCS signal are applied to the inputs of an OR gate 338. The JCS signal and the $\overline{JO1}$ signal are applied to the inputs of an OR gate 340, and the $\overline{JCS}$ signal and the JCS signal are applied to the inputs of an exclusive OR gate 342.

An exclusive OR gate 344 has inputs connected to the JO1 signal and the TRUE output of OR gate 338, and an exclusive OR gate 346 has inputs connected to the TRUE output of OR gate 340 and to the JO2 signal. The TRUE outputs of the exclusive OR gates 342, 344 and 346 are applied to all of the inputs of an AND gate 348.

The TRUE output of AND gate 348 is connected to an input of an AND gate 350 and is also applied through a time delay 352 to an input of an AND gate 354. The TRUE output of AND gate 354 is applied to an OR gate 356 and to another input of the AND gate 350. A FAULT RESET signal is applied to another input of the OR gate 356, and the output of OR gate 356 is applied to an input of the AND gate 354. The TRUE output of the AND gate 350 is applied to an input of the AND gate 336, and the output of the AND gate 336 is an INCH BUTTONS CONDITIONED signal.

Referring now to FIG. 3, lines 35–50, there is shown a Cams A1-A3-B1 Check circuit and a Brake Monitor Self Check circuit in which two signals, A2-B2 HOLD CIRCUIT (system 1) and A2-B2 HOLD CIRCUIT (system 2), as will hereinafter be described in detail, are applied to the inputs of an OR gate 357. The TRUE output of OR gate drives an OR gate 358, and the NOT output of the OR gate 357 is connected to the inputs of an AND gate 360 and another AND gate 362.

The output of the OR gate 358 is applied through a single shot 364 to the input of an OR gate 366, an AND gate 368, and an AND gate 370. The NOT output of the OR gate 358 is connected to an input of an AND gate 372.

The output of the OR gate 366 is applied to an input of an AND gate 374 and the other input of gate 374 is connected to the NOT output of an AND gate 376 which is driven by the $\overline{A1}$ signal, the $\overline{B1}$ signal, and the $\overline{A3}$ signal. The output of the AND gate 374 is applied to an input of the OR gate 358, the OR gate 366, the AND gate 368, and the remaining input of the AND gate 360. The output of the AND gate 360 is a CAM SEQUENCE FAULT signal that drives an LED 376.

The 1CR signal is applied to an input of the AND gate 370 whose TRUE output is applied to an input of an OR gate 378. An AND gate 380 has inputs connected to the TRUE output of OR gate 378 and to the B.E.M. signal. The TRUE output of the AND gate 380 is connected to an input of the AND gate 368, the AND gate 362, the OR gate 378, and the OR gate 358. The NOT output of AND gate 380 is connected to an output device 382 that is connected to the Brake Efficiency Monitor Shelf Check Terminals. The TRUE output of the AND gate 368 is connected to an input of the OR gate 358 and constitutes the MOMENTARY CAM CHECK signal.

The TRUE output of the AND gate 362 drives an LED 384 to indicate a brake monitor shelf check failure, and the TRUE output of AND gate 362 is also connected to an input of OR gate 414. The output of the AND gate 360 is the CAM SEQUENCE FAULT signal that drives an LED 386.

Referring now to FIG. 3, lines 51–66, there is shown an Anti-Repeat Setup. The $\overline{A4}$ signal is applied to an OR gate 388 whose output is applied to an AND gate 390. The A2(NC) signal, the $\overline{A2(NO)}$ signal, the B2(NC) signal and the $\overline{B2(NO)}$ signal are applied to the inputs of an AND gate 392 whose TRUE output is applied to the other input of the AND gate 390. The TRUE output of AND gate 390 is connected to an input of the OR gate 388 and to an input of the AND gate 372. As previously mentioned, the NOR output of OR gate 358 is connected to an input of the AND gate 372, and another input of AND gate 372 is connected to receive the $\overline{APS}$ signal. The remaining input of AND gate 372 is connected to the TRUE output of an AND gate 394, and the output of AND gate 372 is an OFF CHECK signal.

The inputs of an OR gate 396 are connected to the TRUE output of AND gate 392, to the A2(NC) signal, and to the $\overline{A2(NO)}$ signal. The inputs to an OR gate 398 are connected to the TRUE output of the OR gate 357, to the A2(NO) signal and to the $\overline{A2(NC)}$ signal. The TRUE outputs of the OR gates 396 and 398 are applied to an exclusive OR gate 400 whose TRUE output is applied to an AND gate 402.

The inputs of an OR gate 404 are connected to the B2(NC) signal and the $\overline{B2(NO)}$ signal. The inputs of an OR gate 406 are connected to the $\overline{B2(NO)}$ signal and the $\overline{B2(NC)}$ signal. The TRUE outputs of the OR gates 404 and 406 are connected to the inputs of an exclusive OR gate 408 whose TRUE output is applied to the other input of the AND 402.

The TRUE output of the AND gate 402 is applied through a time delay 410 to provide a 0.05 second time delay in producing the A2-B2 check circuit signal. The NOT output of AND gate 402 is the A2-B2 CIRCUIT FAULT signal that drives LED 412 and is also connected to an input of an OR gate 414. A RUN BUTTON PERMISSIVE (SYSTEM 1) signal and a RUN BUTTON PERMISSIVE (SYSTEM 2) signal, which will hereinafter be described in greater detail, are applied to the inputs of an OR gate 416 whose TRUE output is applied to one input of an exclusive OR gate 418. A $\overline{\text{RUN BUTTON PERMISSIVE (SYSTEM 1)}}$ signal and a $\overline{\text{RUN BUTTON PERMISSIVE (SYSTEM 2)}}$ signal, which will be hereinafter described in greater detail, are applied to the inputs of an OR gate 420 whose TRUE output is applied to the other input of the exclusive OR gate 418. The TRUE output of the exclusive OR gate 418 is connected to an input of an AND gate 422 whose other input is connected to the TRUE output of an OR gate 424. The inputs of the OR gate 424 are the FAULT RESET signal and the RUN PERMISSIVE GATE CHECK signal from the TRUE output of the AND gate 422. The NOT output of the AND gate 422 is the RUN PERMISSIVE UNBALANCED signal which drives LED 426.

As previously described the A2-B2 fault circuit signal from the NOT output of AND gate 402 is applied to an input of the OR gate 414. A CLUTCH MODE SELECTOR FAULT signal, the CAM SEQUENCE FAULT signal from AND gate 360, and the BRAKE MONITOR SELF CHECK FAILURE signal from AND gate 362 are also inputs into the OR gate 414. The TRUE output of OR gate 414 is connected to an input of an OR gate 428 whose TRUE output is connected to an input of an AND gate 430. The flasher signal is connected to the other input of the AND gate 430, and the TRUE output of gate 430 drives an output device 432 that drives a system fault lamp 434.

Referring now to FIG. 3, lines 70–94, there is shown an Anti-Repeat Check System 1 and 2 circuit, a Valve Gate Check circuit, and Valve Amplifiers Check circuits. The $\overline{AR1}$ signal and the A1 signal are connected to the inputs of an OR gate 436 whose TRUE output is connected to an input of an AND gate 438. The FAULT RESET SIGNAL is connected to an input of an OR gate 440 whose TRUE output is connected to the other input of AND gate 438. The TRUE output of AND gate 438 is connected to an input of OR gate 440, and to an input of an AND gate 442, while the NOT output of AND gate 438 is an ANTI-REPEAT FAULT SYSTEM 1 signal that drives an LED 444. The inputs of an OR gate 446 receive the $\overline{AR2}$ signal and the B1 signal, and the output of the OR gate 446 is applied to an input of an AND gate 448. The FAULT RESET signal is applied to an input of an OR gate 450 whose TRUE output is applied to an input of the AND gate 448. The TRUE output of AND gate 448 is connected to an input of the OR gate 450 and is connected to the other input of the AND gate 442. The NOT output of the AND gate 448 is an Anti-Repeat Fault System 2 signal that drives an LED 452. The TRUE output of the AND gate 442 is connected to an input of an AND gate 454.

Referring now to FIG. 3, at line 81–85, the AG1 signal, the AG2 signal, the AG3 signal, and the AG4 signal (hereinafter described) are connected to the inputs of an AND gate 456 and an OR gate 458. The TRUE output of the AND gate 456 is applied to an input of an exclusive OR gate 460, and the NOT output of AND gate 456 is connected to an input of an exclusive OR gate 462. In like manner, the TRUE output of the OR gate 458 is connected to an input of the exclusive OR gate 462, and the NOT output of the OR gate 458 is connected to an input of the exclusive OR gate 460. The TRUE outputs of the exclusive OR gates 460 and 462 are connected to the inputs of a sealed AND gate 464 with the FAULT RESET signal being connected to the sealed input of the sealed AND gate 464. The TRUE output of the sealed AND gate 464 is connected to an input of the AND gate 454 and to an input of an AND gate 466. The NOT output of the sealed AND gate 464 is a SYSTEM LOGIC UNBALANCE signal that drives an LED 468 and is also connected to an input of an OR gate 470.

Referring now to FIG. 3, line 87, an ALL AMPS ON signal, and an $\overline{\text{ALL AMPS NOT OFF}}$ signal (hereinafter described) are connected to the inputs of exclusive OR gates 472 AND 474. An ALL AMPS NOT OFF signal and an $\overline{\text{ALL AMPS ON}}$ signal (hereinafter described) are applied to the inputs of exclusive OR gates 476 and 478. The TRUE output of exclusive OR gate 472 is applied to a sealed input and another input of a sealed AND gate 480. The TRUE output of exclusive OR gate 476 is applied to another input of the sealed AND gate 480, and the CLUTCH AMPS AB NORMAL signal, which will hereinafter be described in detail, is applied to the remaining input of AND gate 480.

The TRUE output of the exclusive OR gate 474 is applied to the sealed input and another input of a sealed AND gate 482. The TRUE output of the exclusive OR gate 478 is applied to an input of the sealed AND gate 482, and a CLUTCH AMPS CD NORMAL signal, which will hereinafter be described in detail, is applied to the remaining input of the sealed AND gate 482.

The TRUE output of the sealed AND gate 480 is connected to an input of an AND gate 484 and to two inputs of an AND gate 486. The TRUE output of the sealed AND gate 482 is connected to the other input of the AND gate 484 and is connected to an input of the AND gate 486. The remaining input of the AND gate 486 is connected to the output of an OR gate 488 whose inputs are connected to the FAULT RESET signal and to the TRUE output of the AND gate 486 through a time delay 490.

The TRUE output of AND gate 484 is connected to an input of an OR gate 470, whose NOT output is an AMPLIFIER UNBALANCE signal that drives an LED 492. As previously mentioned, the SYSTEM LOGIC UNBALANCE signal from the NOT output of sealed AND gate 464 is also connected to an input of the OR gate 470. The output of the time delay 490 is connected to inputs of the AND gate 446 and to inputs of the AND gate 454. The TRUE outputs of the AND gates 454 and 466 are the FAULT CIRCUIT A signal and the FAULT CIRCUIT B signal, respectively.

If one or more, but not all, of the amps 566, 568, 578, and 580 (FIG. 4, lines 40–57) turn on, then the Valve Amplifier Check Circuit (FIG. 3, lines 85–95) will detect this improper signal, and the AND gate 486 will turn off. In response, the time delay 490 will begin timing, and if the AND gate 486 does not come back on within a selected time period, preferably ranging from 10 to 32 milliseconds, then the time delay will supply a low input to the AND gates 454 and 466. The low inputs to AND gates 454 and 466 will cause the FAULT CIRCUIT A and FAULT CIRCUIT B signals to go low stopping the ram.

The time delay 490 is necessary because the amps 566, 568, 578 and 580 may occasionally turn on at slightly different times. The preferred range of time delay, from 10 to 32 milliseconds, represents the minimum delay necessary to obtain required reliability and the maximum delay tolerated in turning the ram off when a fault is detected. The actual delay time of time delay 490 is 20 milliseconds.

The NOT outputs of both AND gates 454 and 466 are connected to separate inputs of an OR gate 494. The two other inputs of the OR gate 494 are connected to the RUN BUTTON FAULT signal and the INCH BUTTON FAULT signal, and the TRUE output of OR gate 494 is connected to an input of OR gate 428. As previously mentioned, the TRUE output of OR gate 428 is connected through AND gate 430 and the output device 432 to drive the system fault LED 434.

Figure 4A:
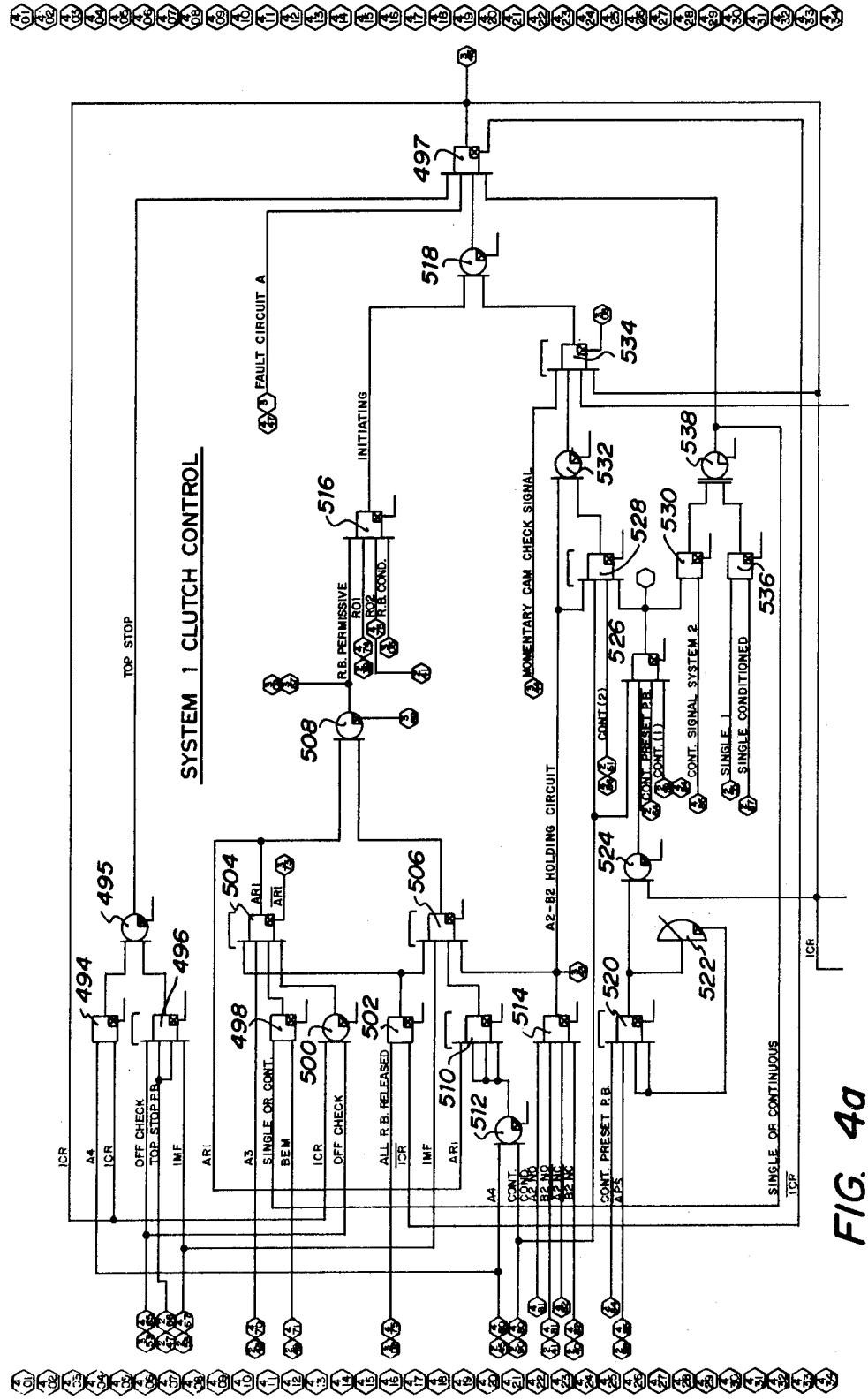
FIGS. 4a, 4b & 4c disclose a circuit diagram of a system one clutch control circuit, a system two clutch control circuit substantially similar to the system one clutch control circuit, and a systems one & two solenoid valve output circuit.
Figure 4B:
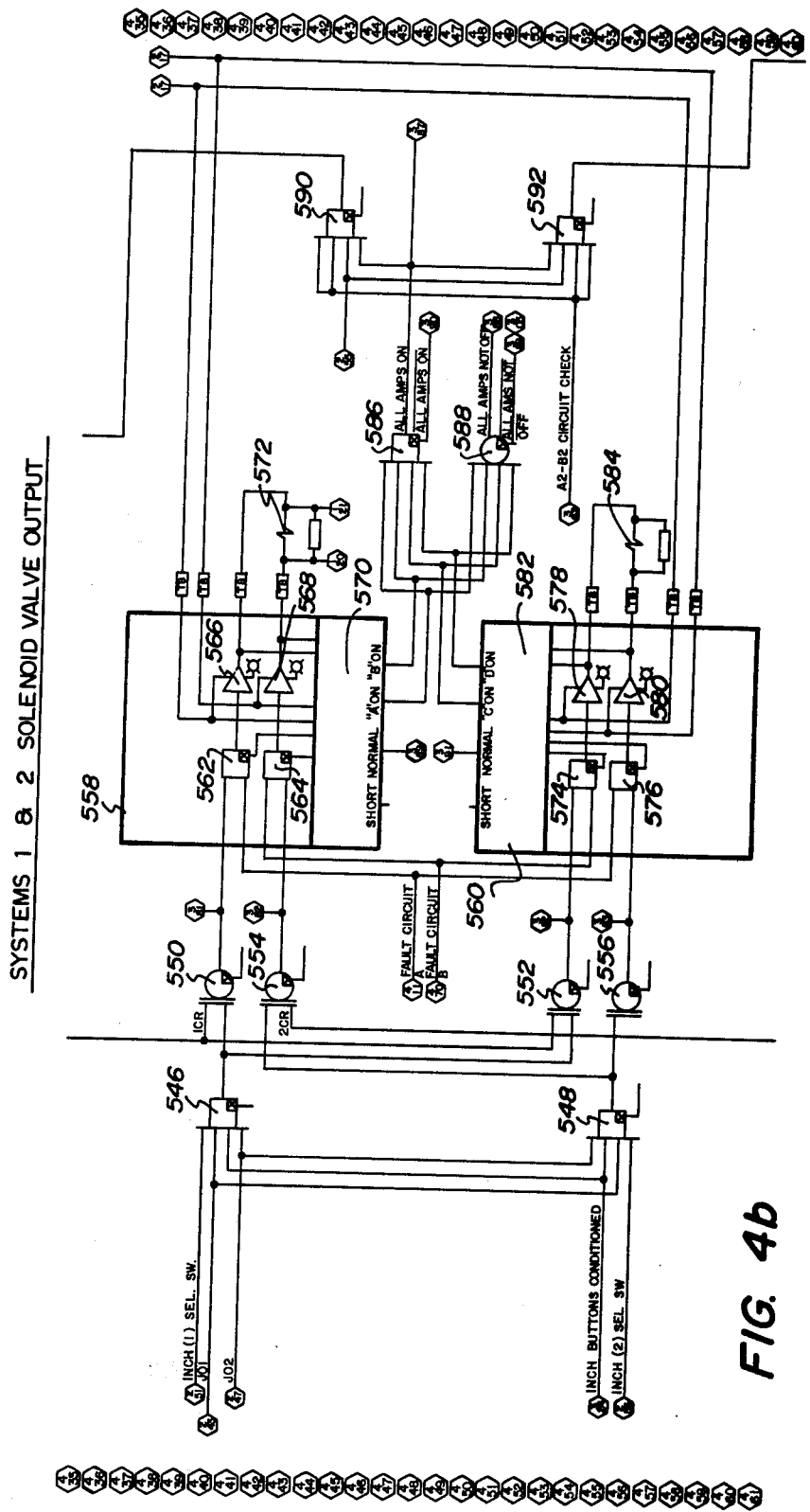
Figure 4C:
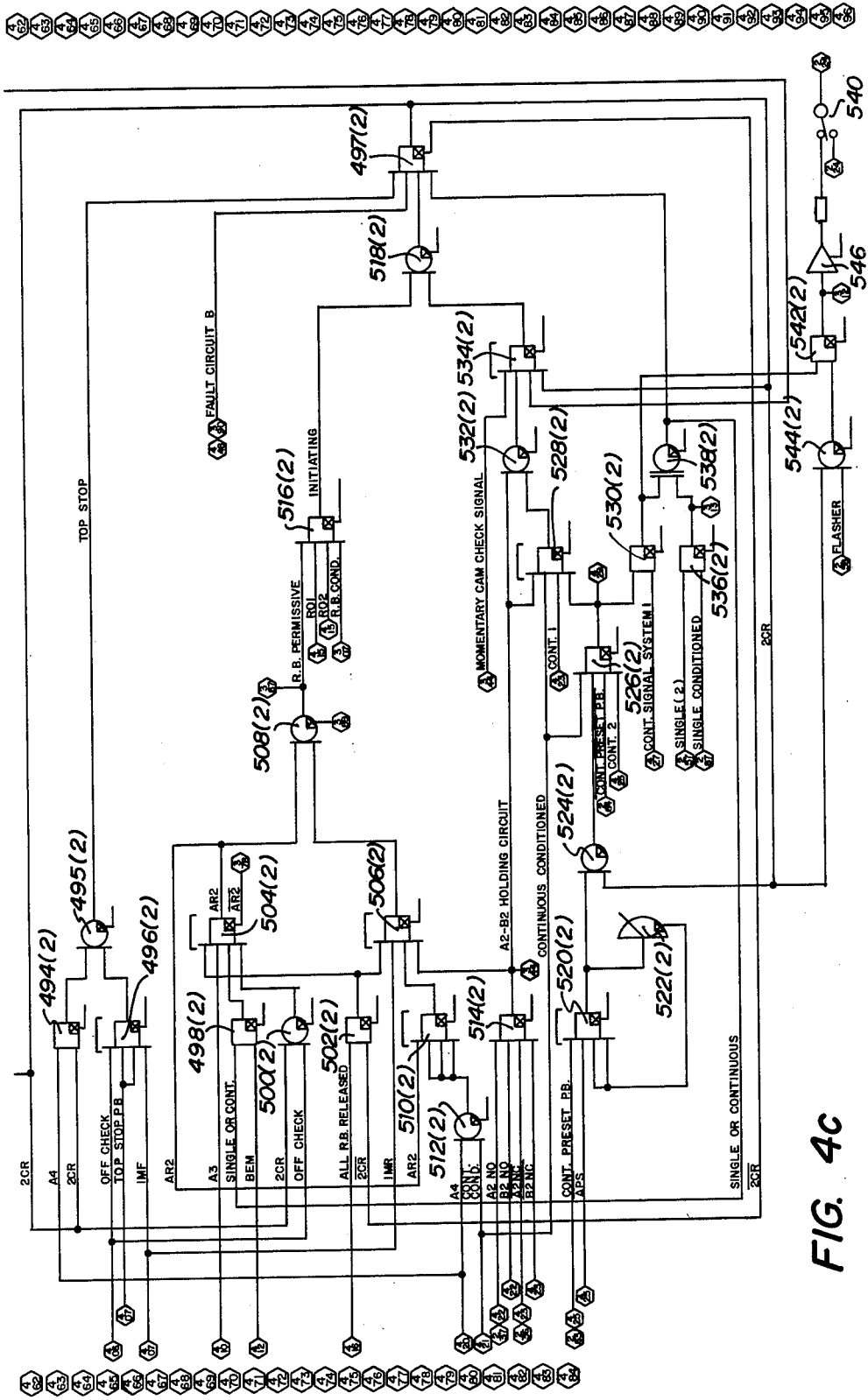

Referring now to FIG. 4, the entire FIG. 4 may be constructed by positioning FIGS. 4a, 4b and 4c adjacently to form a complete circuit. In this position, the line numbers should be in numerical order along the edges of FIG. 4.

Referring now to FIG. 4, lines 1 through 33, there is shown a system 1 clutch control circuit in which an AND gate 494 at line 4 has inputs receiving an A4 signal and a 1CR signal. The 1CR signal will be hereinafter described in greater detail. A 1MF (motor forward) signal is applied to one input of a sealed AND gate 496, and a TOP STOP P.B. signal is connected to two other inputs. An OFF CHECK signal is applied to the sealed input of the sealed AND gate 496. The TRUE outputs of the AND gate 494 and the sealed AND gate 496 are applied to an OR gate 495 whose TRUE output is the TOP STOP signal which is applied to an input of an AND gate 497. The AND gate produces the 1CR signal at its TRUE output.

A SINGLE OR CONTINUOUS signal, as will hereinafter be described in detail, is applied to one input of an AND gate 498 and the B.E.M. signal is applied to the other AND gate. The OR gate 500 has inputs connected to the 1CR signal and the OFF CHECK signal. An AND gate 502 has inputs connected to the ALL RUN BUTTONS RELEASE signal and to the $\overline{\text{1CR}}$ signal from the NOT output of the AND gate 497. The TRUE outputs of the AND gate 498 and the OR gate 500 are applied to inputs of a sealed AND gate 504. The TRUE output of the AND gate 502 is applied to the sealed input of the sealed AND gate 504 as well as to the sealed gate of an AND gate 506. The remaining input of sealed AND gate 504 is connected to the A3 signal, and the output of the sealed AND gate 504 is the AR1 signal which is connected to an OR gate 508 and to the sealed input of a sealed AND gate 510. The remaining inputs of sealed AND gate 510 are connected to the TRUE output of an OR gate 512 whose inputs are connected to the A4 signal and the CONTINUOUS CONDITIONED signal.

The A2NO signal, the B2NO signal, the $\overline{\text{A2NC}}$ signal, and the $\overline{\text{B2NC}}$ signal, are connected to an AND gate 514. The TRUE outputs of AND gates 510 and 514 are connected to two inputs of the sealed AND gate 506. The remaining input of sealed AND gate 506 is connected to the 1MF signal, and the TRUE output of sealed AND gate 506 is connected to an input of the OR gate 504.

The TRUE output of the OR gate 508 is the RUN BUTTON PERMISSIVE signal which is connected to an input of an AND gate 516. The remaining inputs of AND gate 516 are connected to the RO1 signal, the RO2 signal, and the RUN BUTTONS CONDITIONED signal. The TRUE output of the AND gate 516 is an INITIATING signal which is connected to an input of an OR gate 518.

Referring now to FIG. 4, line 25, a sealed AND gate 520 has a sealed input connected to the CONTINUOUS PRESET PUSH BUTTON signal, and the $\overline{\text{APS}}$ signal is applied to another input of the sealed AND gate 520. The TRUE output of the sealed AND gate 520 is connected to a continuous preset time delay 522 having a 10 second on delay. The NOT output of the time delay 522 is connected to the two remaining inputs of the sealed AND gate 520. The TRUE output of sealed AND gate 520 is also connected to an OR gate 524 whose other input is connected to the 1CR signal.

An AND gate 526 has inputs connected to the CONDITIONED CONTINUOUS SELECT signal, the TRUE output of OR gate 524, the $\overline{\text{CONTINUOUS PRESET PUSH BUTTON}}$ signal and the continuous (1) signal. The TRUE output of the AND gate 526 is applied to inputs of a sealed AND gate 528 and an AND gate 530, as well as being connected at the hexagon identified as 4–29 at FIG. 4, line 88.

The A2-B2 HOLDING CIRCUIT signal from AND gate 514 is connected to the sealed input of the sealed AND gate 528 and to an input of an OR gate 532. The remaining two inputs of the sealed AND gate 528 are connected to the CONDITIONED CONTINUOUS SELECT signal and the CONTINUOUS (2) signal. The TRUE output of the sealed AND gate 528 is connected to another input of the OR gate 532 whose TRUE output is connected to an input of a sealed AND gate 534. The hexagon 4–88 at the TRUE output of AND gate 526 is connected to the hexagon 4–27 located at FIG. 4, line 88. This signal is referenced as the CONTINUOUS SIGNAL SYSTEM 1.

The AND gate 530 has its other input connected to the CONTINUOUS SIGNAL SYSTEM 2 as indicated by the hexagon 4–86 located at FIG. 4, line 29 which is connected to the hexagon 4–29 located at FIG. 4, line 86. The SINGLE 1 signal and the CONDITIONED SINGLE SELECT signal are applied to the inputs of an AND gate 536 whose TRUE output is connected to an input of an exclusive OR gate 538. The other input of the exclusive OR gate 538 is connected to the TRUE output of the AND gate 530, and the TRUE output of the exclusive OR gate is the SINGLE OR CONTINUOUS signal which is connected to an input of the AND gate 496 and is also connected to an input of the AND gate 498 as previously described.

As also previously described, the TRUE output of the OR gate 518 is connected to an input of the AND gate 497. Also, the FAULT CIRCUIT A signal is applied to an input to the AND gate 499 as well as the TOP STOP signal from the TRUE output of the OR gate 495. The TRUE output of the AND gate 497 is the 1CR signal which is applied to the sealed AND gate 534 and to the Systems 1 and 2 Solenoid Valve Output Circuit as will hereinafter be described in greater detail. The NOT output of the AND gate 497 is the $\overline{\text{1CR}}$ signal which is connected to the AND gate 502 as previously described.

Referring now to Sheet 4, lines 60 through 97, there is shown a System 2 Clutch Control Circuit that is substantially identical in operation to the System 1 Clutch Control Circuit. The elements of the System 2 Clutch Control Circuit are designated by reference numbers followed by a parenthetical 2. The element identified in System 2 with a reference number followed by a parenthetical 2 corresponds to the elements in System 1 with the same reference number but without the parenthetical 2. For instance, an AND gate identified as 494(2) in System 2 corresponds to the AND gate identified by the reference character 494 in System 1. Also, the various signals generated in System 2 correspond to the signals generated in System 2. The signals in System 2 are identified by the same name as in System 1, or where a signal in System 1 has been identified as a System 1 signal, the corresponding signal in System 2 will be identified as a System 2 signal. For instance, in System 1, the output of the AND gate 497 is identified as 1CR. In System 2, the output of the AND gate 497(2) is identified as 2CR. Similarly, in System 1, the TRUE output of the AND gate 504 is identified as AR1. In System 2, the TRUE output of the AND gate 504(2) is identified as AR2. System 1 and System 2 must operate simultaneously to perform the same function in the same manner, as will hereinafter be described in greater detail.

One difference between the System 1 and System 2 clutch control circuits is that the System 2 clutch control circuit also drives an indicator lamp 540 to indicate the presence of the continuous preset signal. The TRUE output of the AND gate 530(2) is applied to an AND gate 542(2) as well as to the exclusive OR gate 538(2). The 2CR signal from AND gate 497(2) is additionally applied to an input of an OR gate 544(2), and the FLASHER signal is applied to the other input of the OR gate 544(2). The other input of the AND gate 542(2) is connected to the TRUE output of the OR gate 544(2), and the TRUE output of the AND gate 542 is connected to an output device 546 that drives the indicator lamp 540.

Referring now to FIG. 4 lines 35–60, there is shown a Systems 1&2 solenoid valve output circuit, in which the inputs of an AND gate 546 are connected to the INCH (1) select switch signal, the JO1 signal, the INCH BUTTONS CONDITIONED signal, and the JO2 signal. The inputs of an AND gate 548 are connected to the INCH (2) select switch signal, the JO1 signal, the INCH BUTTONS CONDITIONED signal and the JO2 signal. The TRUE output of the AND gate 546 is connected to an input of an exclusive OR gate 550 and an input of another exclusive OR gate 552. The TRUE output of the AND gate 548 is connected to an input of an exclusive OR gate 554 and to an input of another exclusive OR gate 556. The other inputs of the exclusive OR gates 550 and 552 are connected to the 1CR signal, and the other inputs of the exclusive OR gates 554 and 556 are connected to the 2CR signal.

The TRUE output of the exclusive OR gate 550 is connected to the "A" input of a twin amplifier 558, and the TRUE output of the exclusive OR gate 554 is connected to the "B" input of the twin amplifier 558. The TRUE output of the exclusive OR gate 552 is connected to the "C" input of a twin amplifier 560, and the TRUE output of the exclusive OR gate 556 is connected to the "D" input of the twin amplifier 560. The FAULT CIRCUIT A signal is also connected to the "A" input of the twin amplifier 558 and the "D" input of the twin amplifier 560. The fault circuit "B" signal is also connected to the "B" input of the twin amplifier 558 and to the "C" input of the twin amplifier 560.

The twin amplifiers 558 and 560 are substantially identical and are preferably Westinghouse amplifiers NL329. Twin amplifier 558 includes an AND gate 562 connected to the "A" input, and an AND gate 564 connected to the "B" input. The TRUE output of AND gate 562 is connected to an amplifier 566, and the TRUE output of the AND gate 564 is connected to an amplifier 568. An AC power input is also supplied to the amplifiers 566, 568 and the amplifier short detection system 570. The NOT outputs of the AND gates 562 and 564, and the outputs of the amplifiers 566 and 568, are connected to an amplifier short detection system 570 which generates a NORMAL signal, an "A" ON signal and a "B" ON signal. The outputs of amplifiers 566 and 568 are also connected to either side of the clutch valve solenoid 572 which activates a clutch in the drive system of the press 10.

The twin amplifier 560 includes an AND gate 574 having its inputs connected to the "C" input and an AND gate 576 having its input connected to the "D" input. The TRUE outputs of the AND gates 574 and 576 are connected to amplifiers 578 and 580, respectively. The NOT outputs of the amplifiers 574 and 576 and the outputs of the amplifiers 578 and 580 are connected to an amplifier short detection system 582 which produces a NORMAL signal, a "C" ON signal and a "D" ON signal. An AC output is also supplied to the amplifiers 578 and 580 and to the amplifier short detection system 582. The outputs of the amplifiers 578 and 580 are connected to either side of a clutch valve solenoid 584. The clutch solenoids 584 and 572 operate in unison to actuate a clutch in the drive system of the press 10, as will hereinafter be described in greater detail.

The "A" ON signal, the "B" ON signal, the "C" ON signal and the "D" ON signal are applied to the inputs of an AND gate 586 and to the inputs of an OR gate 588. The TRUE output of the OR gate 588 is an ALL AMPS NOT OFF signal and the NOT output of the OR gate is an $\overline{\text{ALL AMPS NOT OFF}}$ signal. The TRUE output of the AND gate 586 is an ALL AMPS ON signal and the NOT output of the AND gate 586 is an $\overline{\text{ALL AMPS ON}}$ signal. The ALL AMPS ON signal is applied to inputs of an AND gate 590 and an AND gate 592. The APS signal and the A2-B2 CIRCUIT CHECK signal are applied to the remaining inputs of the AND gate 590 whose TRUE output is applied to an input of the sealed AND gate 534. Likewise, the APS signal and the A2-B2 CHECK CIRCUIT signal are applied to the remaining inputs of the AND gate 592 whose TRUE output is applied to an input of the sealed AND gate 534 (2).

The function of the motor control circuit illustrated in FIGS. 1–4 and described in conjunction therewith is to control the operation of the ram 14 shown in FIG. 5.

In order for the ram 14 to move in any direction, it is necessary to engage a clutch to connect the transmission 20 to the drive mechanism of the press 10. In order to engage this clutch, two three-way valves must close simultaneously. If either of the three-way valves closes by itself, the open valve will act as an exhaust valve for the closed valve and the clutch will not engage. The two valves are closed by the energization of the clutch valve solenoids 572 and 584 shown in FIG. 4 at lines 42 and 55. The use of two three-way valves to close the drive clutch for a press is a known safety feature found on many presses and press brakes.

The dual function of the control system of the present invention is to control the operation of the ram 14 and to detect faults in the control system. When a fault is detected in the control system, the ram 14 is automatically stopped and indicator lamps or LED's are illuminated.

Referring now to FIG. 1, lines 33–41, there is shown a MAIN MOTOR CIRCUIT for controlling the main motor 24. The forward-reverse switch 66 functions to turn the main motor 24 on in a forward direction or a reverse direction through the relays 1MF and 1MR. The start switch 68 is used to start the main motor 24. Also shown in the main motor circuit is the flywheel brake pressure switch 3PS which is used to activate a brake to stop the flywheel. The Brake Monitor Timer (FIG. 1, lines 15–22), the Lubrication System Circuit (FIG. 1, lines 25–32) and the Slide Adjust Circuit (FIG. 1, lines 41–50) are provided for convenient reference in standard circuit design symbolic representation.

Referring now to FIG. 2, lines 30–45, there is shown a plurality of rotary cam limit switches that are connected to the drive system of the press 10 to indicate the position of the ram 14. For reference purposes, the cycle of the ram from the top of the ram stroke to the bottom of the ram stroke and back to the top of the ram stroke will be considered as a 360° cycle. The top of the ram stroke is 0° while the bottom of the ram stroke is 180°. The return of the ram stroke from the bottom to the top will be referenced as 180° to 360°.

The rotary cam limit switches are actuated or deactuated according to the position of the ram 14. Referring to FIG. 6, the rotary cam limit switch sequence is graphically disclosed. Rotary cam limit switch CLSA-1 is actuated at 240° and deactuated at 300°. Switch CLSA-2 is actuated at 180° and deactuated at 300°. Switch CLSA-3 is actuated at 200° and deactuated at 260°. CLSA-4 is actuated at 30° and deactuated at 320°. CLSA-B1 is actuated at 240° and deactuated at 300° which is the same as switch CLSA-1. Switch CLSB-2 is actuated at 180° and deactuated at 330° which is the same as switch CLSA-2.

The rotary cam limit switches as shown in FIG. 2 are in the deactuated position. When the switches are actuated, they move to the opposite position. For instance at 240° switch CLSA-1 is actuated to the open position which causes the input 82 to generate a low A1 signal and a high $\overline{\text{A1}}$ signal. At 180°, switch CLSA-2 is actuated causing contacts 98 to open and causing contacts 100 to close. In response thereto, input 86 produces a low A2(NC) signal and a high $\overline{\text{A2(NC)}}$ signal, and input 88 produces a high A2(NO) signal and a low $\overline{\text{A2(NO)}}$ signal. The remaining rotary cam limit switches operate in the same fashion. Thus when switch CLSA-3 is actuated, signal A3 goes low and signal $\overline{\text{A3}}$ goes high. When switch CLSA-4 is actuated, signal A4 goes high and signal $\overline{\text{A4}}$ goes low. When switch CLSB-1 is actuated, the signal B1 goes low and signal $\overline{B1}$ goes high. When switch CLSB-2 is actuated, signal B2(NC) goes low, signal $\overline{B2(NC)}$ goes high, signal B2(NO) goes high, and signal $\overline{B2(NO)}$ goes low.

Referring now to FIG. 2 lines 46–57, additional input signals are shown. When the top stop contact 7PB is actuated, the TOP STOP PB signal goes low for causing the ram 14 of the press to stop at the top of its cycle at 360°. The variac 100 causes input 110 to produce a BRAKE EFFICIENCY MONITOR signal (BEM) which causes the brake monitor to self check. The fault reset button 112 is actuated to produce a fault reset signal from the single shot 116 to reset various gates of the control circuit after a fault has been detected and corrected in the circuit. The 1MF contacts, when actuated, cause the input 118 to produce a high 1MF signal to indicate that the main motor 24 is operating in a forward direction. The clutch brake switch 120, when actuated, causes the input 122 to produce a high APS signal to indicate that a clutch brake of the press 10 is on. The flasher 122 causes the input 124 to produce a FLASHER signal.

Referring now to FIG. 2 line 13, the INCH-SINGLE-CONTINUOUS contact 134 is closed when the press 10 is in the inch mode, the single mode, or the continuous mode. Additionally, the contact 132 is closed to place the press 10 in the inch mode.

Only one of the inch, single, or continuous modes may be chosen for the operation of the press 10. In the inch mode, the ram 14 will move only so long as the inch buttons 192 and 194 are depressed. When one of the inch buttons 192 or 194 is released, the press will stop and will not start again until both of the inch buttons are released and depressed again.

In the single mode, the ram 14 will operate through one entire cycle, so long as the run buttons 144, 146, 148 and 150 are depressed, and then the ram 14 will stop at the top of the stroke at 360°. If one of the run buttons is released during the stroke, the ram 14 will stop. To start the ram again, the run buttons 144, 146, 148 and 150 must be released and depressed again. The ram 14 will then continue to the top of the stroke and stop.

In the continuous mode, the ram will continue to operate until it is stopped by the master panel stop switch 130, the top stop switch 7PB, or in some other manner. To begin the operation of the ram in the continuous mode, the continuous preset button 260 must be depressed, and then within a predetermined time period, all operable run buttons 144, 146, 148 and 150 must be depressed simultaneously and held until the ram 14 reaches the bottom of its stroke at 180° in the ram cycle.

Referring now to FIG. 2, lines 28–48, the operation of the run buttons 144, 146, 148 and 150 is illustrated in detail. Run buttons 144 and 146 are located at operator station number 1 and run buttons 148 and 150 are located at operator station number 2. All four of these run buttons must be depressed simultaneously in order to produce the proper run signals. However, it will be understood that a dummy plug-in may be provided at switch 128 or 126 so that only the operation of the run buttons at one operator station is necessary to operate the press 10.

If run buttons 144, 146, 148 and 150 are simultaneously depressed, signal RCS will go low, signal $\overline{RCS}$ will go high, signal RCP will go low, signal $\overline{RCP}$ will go high, signal RO1 will go high, signal $\overline{RO1}$ will go low, signal RO2 will go high, and signal $\overline{RO2}$ will go low. When the run buttons are released each of the above signals will change to the opposite polarity.

Referring now to FIG. 2, lines 50–64, the selector contacts are disclosed in detail. When the inch contacts 224, 226, 230 and 232 are actuated to the closed position the signals INCH (1) and INCH (2) go high. Likewise, when the single contacts 236, 238, 242 and 244 are actuated to the closed position, the signals SINGLE (1) and SINGLE (2) go high. Similarly, when the continuous contacts 248, 250, 254 and 256 are actuated, the signals CONTINUOUS (1) and CONTINUOUS (2) go high. Also, when the continuous contacts 254 and 256 are actuated and the continuous preset contacts 260 are actuated, the CONTINUOUS PRESET signal goes high and the NOT CONTINUOUS PRESET signal goes low. As will be hereinafter described in greater detail, the INCH (1) and (2), SINGLE (1) and (2), and CONTINUOUS (1) and (2) signals control the mode in which the press 10 will operate. The yes-no switches 218, 220 or 222 may be used to prevent operation in one or more modes.

Referring now to FIG. 2, lines 77–96, there is shown a Select Switch Check Circuit that is designed to insure that the INCH (1) and (2) signals, the SINGLE (1) and (2) signals, and the CONTINUOUS (1) and (2) signals are proper. Since the press cannot be in two different modes at the same time, the Select Switch Check Circuit checks to insure that only one type of mode signal is received. Additionally, if an INCH (1) signal is received, the INCH (2) signal should also be received. The same is true for the other two modes. Thus, the SELECT SWITCH CHECK circuit also checks to insure that if one mode signal is present, then both mode signals are present. If an erroneous or improper signal is received, a clutch mode select fault signal is generated at the TRUE output of AND gate 286, and the SELECT SWITCH CHECK circuit will prevent the operation of the press 10.

To illustrate the operation of the SELECT SWITCH CHECK circuit, assume that the INCH (1) and (2) signals go high and that the SINGLE (1) and (2) signals and the CONTINUOUS (1) and (2) signals remain low. This is a proper signal. The INCH (1) and (2) signals are applied to the inputs of the sealed AND gate 278. The INCH (1) and (2) signals also cause OR gates 268 and 270 to go high at their TRUE outputs, either of which causes OR gate 272 to go high at its TRUE output. The single shot 284 goes high at its output and applies a high signal to the sealed input of the AND gate 278. Finally, since the OR gate 266 does not receive an input signal, the NOT output of OR gate 266 stays high and is applied to the remaining input of the sealed AND gate 278. Since all of the inputs to the AND gate 278 went high, the CONDITIONED INCH SELECT signal goes high at the TRUE output of the sealed AND gate 278, indicating proper INCH (1) and INCH (2) signals were received. The CONDITIONED INCH SELECT signal must be present in order for the press 10 to operate in the inch mode.

Now, to illustrate how the Select Switch Check circuit will detect an improper signal, assume that in addition to the INCH (1) and (2) signals, a CONTINUOUS (1) signal is present. The CONTINUOUS (1) signal will supply an input to the OR gate 266 causing the NOT output of the OR gate 266 to go low, and one of the inputs to the sealed AND gate 278 will go low. Thus, the output of the sealed AND gate 278 will go low and the CONDITIONED INCH SELECT signal will go low. Also, the INCH (1) and (2) signals will cause the TRUE output of the OR gates 268 and 270 to go high turning on the OR gate 274 whose TRUE output is applied to an AND gate 286. Since none of the outputs of the sealed AND gates 278, 280 or 282 are high, the NOT output of the OR gate 276 will remain high, and both inputs to the AND gate 286 will be high. Thus, the output of the AND 286 will cause the LED 290 to illuminate indicating that a fault has been detected by the Select Switch Check circuit.

As another illustration of how the Select Switch Check circuit will detect an improper signal, assume that only the SINGLE (1) signal goes high and the remaining input signals remain low. Since the SINGLE (2) signal remains low, one of the inputs to the sealed AND gate 280 will remain low, and thus, the output of the sealed AND gate 280 will remain low and the CONDITIONED SINGLE SELECT signal will not be produced. Again, the output of OR gate 274 will go high, and the NOT output of the OR gate 276 will remain high. The two inputs to the AND gates 286 are high so that the AND gate 286 output is high to illuminate the LED 290.

Referring now to FIG. 3, lines 1–20, there is shown a Run Button Check circuit. The inputs of the AND gates 292 are connected to the signals RCS, RCP, $\overline{RO1}$, and $\overline{RO2}$. Each of these signals will go high when all the run buttons are released causing the AND gate 292 to produce the ALL RUN BUTTONS RELEASED signal at its TRUE output to indicate that all run buttons have been released. In response to the ALL RUN BUTTONS RELEASED signal, OR gate 292 turns on which turns on AND gate 296 provided the ALL CLUTCH AMPS OFF signal is received at the other input of the AND gate 296. The ALL CLUTCH AMPS OFF signal indicates that all of the amps in the twin amps 558 and 560 shown in FIG. 4 are off. Thus, if all of the run buttons are released and the clutch amps are off, the sealed input of the sealed AND gate 298 will go high. The sealed input will remember the high signal until the sealed AND gate is turned on and off. In this manner, the Run Button Check circuit insures that the RUN BUTTONS CONDITIONED signal will not be produced at AND gate 298 unless all of the run buttons have been released completely before they are depressed.

The $\overline{RCS}$ signal and the $\overline{RCP}$ signal go high when the run buttons are depressed simultaneously, and these signals are applied to two inputs of the sealed AND gate 298. The remaining input on the sealed AND gate 298 will go high only if the Run Button Check circuit determines that the signals coming from the run buttons are proper.

The OR gates 312 and 314, the exclusive OR gates 306, 308 and 310, and the AND gate 302 operate to check to insure that the run signals are proper. To illustrate this checking operation, first assume the run bottons have been depressed and a proper signal is generated. In such case, the $\overline{RO2}$ signal goes low, the RCP signal goes low, the RO2 signal goes high, and the RO1 signal goes high. The RCS signal goes low, the $\overline{RCS}$ signal goes high, and the RO1 signal goes high. Under these conditions, the OR gates 312 and 314 do not turn on, and the TRUE outputs thereof remain low. Each of the exclusive OR gates 306, 308 and 310 have one high input and one low input and therefore turn on with their TRUE outputs going high. All of the inputs to the AND gate 302 go high causing the TRUE output thereof to go high which is applied to an input of AND gate 300. The TRUE output of AND gate 302 is also applied through the timer 316 to an input of the AND gate 304 to keep AND gate 304 on, and the ouput of AND gate 304 is applied to two inputs of the AND gate 300. Assuming the RUN BUTTON PERMISSIVE GATE CHECK signal is high, the AND gate 300 turns on and supplies the final high input signal to the AND gate 298 to provide the RUN BUTTONS CONDITIONED signal. The RUN BUTTONS CONDITIONED signal must be present before the press will operate.

If all of the run buttons are released, then all of the high signals going to the OR gates 306, 308 and 310 will go low and all of the low signals will go high. Thus, if all of the run buttons are released, the exclusive OR gates 306, 308 and 310 and the AND gate 302 stay on.

To illustrate the checking function of the Run Button Check circuit, consider the situation where all of the run buttons have been depressed, but a fault has occurred and the signal $\overline{RO2}$ is high. This is an improper signal which should not occur if the run buttons are in working condition. The high $\overline{RO2}$ signal will turn on the OR gate 312 and two high inputs will be received at the exclusive OR gate 306. In response to the two high inputs, the exclusive OR gate 306 will turn off, and since one input to the AND gate 302 is low, the TRUE output of AND gate 302 will go low turning off AND gate 300 and the sealed AND gate 298. Thus, upon receipt of this faulty signal, the RUN BUTTONS CONDITIONED signal will not be produced.

Also, when the AND gate 302 turns off, the AND gate 304 will be turned off after a 0.03 second delay, and the NOT output of AND gate 304 will go high turning on the LED 320 to indicate a run button fault. As long as proper run button signals are being received, the AND gate 304 will remain on, supplying a high output to the input of AND gate 322. When the $\overline{\text{SUSTAINED SYSTEM (1)}}$ signal, the RUN BUTTON PERMISSIVE SYSTEM (1) signal, and the TRUE output of AND gate 323 go high, the AND gate 322 will turn on, illuminating the operator station indicating lamps 326 and 328. As will be hereinafter described in detail, the lamps 326 and 328 will be illuminated when the run buttons 144, 146, 148 and 150 may be used to operate the press 10, will be flashing when the preset button 260 has been pressed in the continuous mode, and will be off when the run buttons are either inoperable to run the press or are no longer necessary to sustain operation of the press in the continuous mode.

Referring now to FIG. 3, lines 20–34, an INCH BUTTON CHECK circuit is shown that functions in a fashion similar to the Run Button Check circuit to determine whether or not the inch buttons are providing proper signals. The AND gate 330, the OR gate 332 and the AND gate 334 function to check to insure that, when the ram 14 stops while an inch button is depressed, all of the inch buttons must be released before they are depressed to start the ram. If all of the inch buttons are not released prior to depressing them again, there will be a low signal at the TRUE output of the AND gate 334 which is applied to an input of the sealed AND gate 336, and the INCH BUTTONS CONDITIONED signal cannot be produced. The gates 330, 332 and 334 function in the same manner as the gates 292, 294 and 296 previously described.

The OR gates 338 and 340, the exclusive OR gates 334, 346 and 342, the AND gate 348, the AND gate 350, AND gate 354, and the OR gate 356 function to check to insure that proper signals are received from the inch buttons. Since this circuit is substantially identical to the corresponding portion of the Run Button Check circuit described above, only one illustration of this checking circuit will be described. Assume that a proper signal is received from the inch buttons when the inch buttons are depressed or actuated. The JO1 signal will go high, the JCS signal will go low, the $\overline{JO1}$ signal will go low, the JO2 signal will go high and the $\overline{JCS}$ signal will go high. The $\overline{JO2}$ signal will go low. Under these conditions, both inputs of the OR gates 338 and 340 are low, and the outputs of the OR gates 338 and 340 will remain low. For each of the exclusive OR gates 342, 344 and 346, one of their inputs is high and one of their inputs is low. Thus, the three exclusive OR gates 342, 344 and 346 are turned on. Because of the high TRUE outputs of the OR gates 342, 344 and 346, the AND gate 348 is turned on, the AND gate 354 is turned on and the AND gate 350 is turned on. Thus, the sealed AND gate 336 will be turned on provided the CONDITIONED INCH SELECT signal and the $\overline{JCS}$ signal are high, and the TRUE output of the sealed AND gate 336 will produce the INCH BUTTONS CONDITIONED signal which is necessary for the press to operate in the inch mode.

Referring now to FIG. 3, lines 33-34, there is shown a Cams A1-A3-B1 Check circuit. The A2-B2 HOLD CIRCUIT (SYSTEM 1) signal and the A2-B2 HOLD CIRCUIT (SYSTEM 2) signal are applied to the inputs of the OR gate 356. If the rotary cam limit switches CLSA-2 and CLSA-3 are working properly, the two signals applied to the inputs of OR gate 356 will go high when the ram 14 is at the bottom of its stroke (180°), and will go low when the stroke cycle is at 330° near the top of the ram stroke. The TRUE output of the OR gate 357 will turn on the OR gate 358, the single shot 364 and the OR gate 366, which will supply a high input to AND gate 374. The $\overline{A1}$ signal, the $\overline{B1}$ signal, and the $\overline{A3}$ signal are connected to all of the inputs of the AND gate 376. The signals $\overline{A1}$ and $\overline{B1}$ will go high at 240° and low at 300° in the ram cycle. The $\overline{A3}$ signal will go high at 200° and low at 260°. Thus the AND gate 376 turns on at 240° and off at 260°. When the OR gate 366 is turned on by the single shot 364 at 180° the NOT output of the AND gate 376 should be high and the AND gate 374 will be turned on. The output of the AND gate 374 is connected to an input of the OR gate 366 and to an input of the AND gate 360. Assuming that all of the rotary cam limit switches are functioning properly, the signals $\overline{A1}$, $\overline{B1}$ and $\overline{A3}$ will go high at 240° causing the NOT output of the AND gate 376 to go low turning off the AND gate 374.

If however one of the inputs to AND gate 376 does not go high indicating an improper signal, the AND gate 376 will not turn on and the NOT output of AND gate 376 will stay high keeping AND gate 374 turned on. When the ram cycle reaches 330°, both inputs to the OR gate 357 will go low causing the NOT output of OR gate 356 to go high. The NOT output of OR gate 357 will turn the AND gate 360 on indicating a cam sequence fault, and the TRUE output of AND gate 360 will illuminate the LED 386. The pulse at 180° from the single shot 364 will also turn on the AND gate 368 which produces a momentary cam check signal which is necessary to operate the press 10 in the continuous mode, as will be described hereinafter.

Referring now to FIG. 3, lines 42-50, there is shown a brake monitor self check circuit. The single shot 364 applies a high pulse to the AND gate at 180° in the ram cycle, and the ICR signal is applied to the other input of the AND gate 370 so that AND gate 370 turns on at 180° in the ram cycle. The AND gate 370 turns on the OR gate 378 which turns on the AND gate 380. When AND gate 380 turns on, the output device 382 turns off causing the brake efficiency monitor to self check. The B.E.M. signal and the self check of the Brake Monitor may be understood by reference to FIG. 2, line 49 and to FIG. 1, lines 17-21. When the NOT output of AND gate 380 at FIG. 3, line 47 goes low, the Brake Monitor Timer at FIG. 1, line 17 begins timing and the contact 45 opens. When contact 45 opens, the B.E.M. signal produced by input 110 at FIG. 2-49 goes low for a short angular distance in the ram cycle turning AND gate 380 off and turning the output device 382 back on. However, if the brake monitor is not working properly and the B.E.M. signal remains high, the NOT output of the OR gate 357 will go high at 330° in the ram cycle and will turn on the AND gate 362 whose TRUE output illuminates LED 384 indicating a brake monitor self check failure.

The TURE outputs of the AND gates 374, 368 and 380 are connected to the inputs of the OR gate 358 to insure that these AND gates turned off properly. If one of the AND gates 374, 368 or 380 fails on with a high TRUE output, the NOT output of OR gate 358 remains low. The NOT output of OR gate 358 would, thus, turn off the AND gate 372 and the OFF check signal remains low. Also, the single shot 364 will not be reset and cannot provide an output signal until the OR gate 358 turns off then on.

Referring now to FIG. 3, lines 51-66, there is shown an Anti-Repeat Set Up for generating an OFF CHECK signal at the output of the AND gate 372. The OFF CHECK signal is necessary to begin or initiate a down stroke of the ram.

Referring now to FIG. 3, line 53, the AND gate 372 has one input connected to the NOT output of the OR gate 358 at FIG. 3, line 43 and another input connected to the $\overline{APS}$ signal. The $\overline{APS}$ signal indicates that the clutch brake is not on when the ram is stopped. The $\overline{APS}$ signal goes low whenever the ram is operating through the ram cycle. Thus, the OFF CHECK signal from AND gate 372 goes high only when the ram is stopped. If the rotary cam limit switches CLSA-2, CLSB-2, CLSA-1, CLSA-3, and CLSB-1 are working properly, and if the Brake Monitor Self Check circuit indicates that the brake monitor self check is working properly, then the NOT output of the OR gate 358 will be high from 330° to 180° in the ram stroke.

The OR gates 396, 398, 404, and 406, the exclusive OR gates 400 and 408, and the AND gate 402 function to check the signals from the rotary cam limit switches CLSA-2 and CLSB-2 to insure that these signals are proper or logical. If the proper signals are being received, the OR gate 396 will turn on at 330° and will turn off at 180°. The OR gate 398 will also turn on at 180° and will turn off at 330° in the ram cycle. Either the OR gate 396 or the OR gate 398 will always be on, but these two OR gates should never be on at the same time. Thus, the exclusive OR gate 400 should always be on.

The OR gates 404 and 406 work in a similar manner. If the proper signals are received at OR gate 404, the OR gate 404 will be on from 330° to 180° in the ram cycle. The OR gate 406 will be on from 180° to 330° in the cycle. Thus, one or the other, but never both, of the OR gates 404 and 406 will be on, and the exclusive OR gate 408 will always be on. In response to the TRUE outputs of the exclusive OR gate 400 and 408, the AND gate 402 will also be on constantly.

To illustrate the detection of a faulty signal, assume that the $\overline{A2(NO)}$ signal remains on at 190° in the ram cycle causing the OR gate 396 to turn on. At 190° in the ram cycle, the OR gate 398 will also be on, and the exclusive OR gate 400 will turn off. Since one of the inputs to the AND gate 402 goes low, the TRUE output of AND gate 402 will go low and the NOT output will go high illuminating LED 412 to indicate and A2-B2 CIRCUIT FAULT. If all signals are proper and the RUN BUTTON PERMISSIVE GATE CHECK signal is high, the AND gate 394 should always be on. The $\overline{APS}$ signal is high when the ram is stopped and low when the ram is operating. Thus, the AND gate 372 should have one input that is always on and two inputs that come on at 330° and go off at 180° to produce an OFF CHECK signal whenever the ram is stopped in its cycle between 330° and 180°.

If an improper signal from switches CLSA-2 or CLSB-2 is detected, the A2-B2 CIRCUIT FAULT signal turns on the OR gate 414 which turns on the OR gate 428. The TRUE output of the OR gate 428 in conjunction with the FLASHER signal turns on the AND gate 430 and the output device 432 to repetitively illuminate the system fault lamp 434. Referring back to FIG. 3, line 49, if a brake monitor self check failure is detected at the AND gate 362, then the TRUE output of the AND gate 362 will likewise turn on the OR gates 414 and 428, the AND gate 430 and the output device 432 to repetitively illuminate the system fault lamp 434.

Referring now to FIG. 3, lines 66-70, there is shown a Run Button Permissive Gate Check circuit for checking the logic of the RUN BUTTON PERMISSIVE signals of System 1 and System 2. Either the TRUE or the NOT signal of the Run Button Permissive signals of System 1 and System 2 should always be on, but the TRUE and the NOT signals should never occur at the same time. So long as the RUN BUTTON PERMISSIVE signals of System 1 and System 2 are proper, either the OR gate 416 or the OR gate 420 will be on, but gates 416 and 420 should never be on at the same time. If an improper signal is received and both OR gates 416 and 420 either simultaneously turn off or simultaneously turn on, then the OR gate 418 and the AND gate 422 will turn off. The Not output of the AND gate 422 would then go high turning on OR gate 428, AND gate 430 and the output device 432 to illuminate the system fault lamp 434. Also, the TRUE output of the AND gate 422 would go low turning off AND gates 394 and 372 to cause the OFF CHECK signal to go low. As previously mentioned, the OFF CHECK signal is necessary to initiate a down stroke of the ram.

Referring now to FIG. 3, line 66, the OR gate 424 has an input connected to the output of the AND gate 422. The OR gate 424 functions to hold one input of the AND gate 422 on so long as the AND gate 422, itself, remains on. If AND gate 422 turns off, then the OR gate 424 must be turned on again by the fault reset signal.

Referring now to FIG. 3 lines 70-80, there is shown an Anti-Repeat Check System 1 and 2 circuit for determining whether the AND gates 504 and 504(2) shown in FIG. 4 properly turned off causing the signals AR1 and AR2 to go low. If AND gates 504 and 504(2) are receiving the proper signals, both gates should turn off at 200° in the ram cycle when the signal A3 goes low. Thus, the signals $\overline{AR1}$ and $\overline{AR2}$ should go high at 200° in the ram cycle. The signals A1 and B1 should go low at 240° and back high at 300° in the ram cycle. Thus, if the system is working properly the OR gates 436 and 446 will be constantly on and the AND gates 438, 448 and 442 will also remain constantly on.

To illustrate the checking function of this circuit, assume that the signal $\overline{AR1}$ failed to go high at 200° in the ram cycle. The signal A1 will go low at 240° turning off the OR gate which will cause the AND gates 438, 422 and 454 to turn off. When AND gate 454 turns off, the NOT output will go high turning on the OR gates 494 and 428, the AND gate 430 and the output device 432 to illuminate the system fault lamp 434. Also, the NOT outputs of the AND gates 438 and 448 are connected to the LEDs 444 and 452 to indicate in which of the two systems an anti-repeat fault occurred.

The OR gates 440 and 450 function to hold a high input on the AND gates 438 and 448 in the same manner as described with regard to the OR gate 424.

Referring now to FIG. 3, lines 81 through 85, there is shown a valve gate check circuit for insuring that the exclusive OR gates 550, 552, 554 and 556, shown at FIG. 4, lines 40 through 56, are functioning properly. All of the signals AG1, AG2, AG3 and AG4 from the just mentioned OR gates should be either all high or all low at all times. Suppose that one of the signals, such as AG3 goes low while the remaining signals AG1, AG2 and AG4, remained high. In such case, the AND gate 456 would turn off, but the OR gate 458 would remain on. In response to AND gate 456 turning off, the exclusive OR gates 460 and 462 would turn off, which would turn off the AND gate 464. The NOT output of the AND gate 464 would turn on an LED 468 indicating a system logic unbalance and would turn on the OR gate 470 to prevent the LED 492 from being illuminated. Also, when the TRUE output of AND gate 464 goes low, AND gates 454 and 566 will turn off, which will turn on OR gates 494 and 428, AND gate 430 and an output device 432 to repetitively illuminate the system fault lamp 434. Also, the FAULT CIRCUIT A and the FAULT CIRCUIT B signals will go low preventing the operation of the ram.

Referring now to FIG. 3, lines 85 through 96, there is shown a Valve Amplifiers Check circuit. If the twin amps 458 and 460 shown in FIG. 4 at lines 40 and 52 are functioning properly, the amps 566, 568, 578 and 580 will either all be on or all be off. The valve amplifier check circuit will check the ALL AMPS ON signal, the ALL AMPS NOT OFF signal, the $\overline{\text{ALL AMPS NOT OFF}}$ signal and the $\overline{\text{ALL AMPS ON}}$ signal to insure that these signals are logical.

To illustrate the operation of the valve amplifier check circuit, assume that an illogical signal occurred with the $\overline{\text{ALL AMPS ON}}$ signal and the $\overline{\text{ALL AMPS NOT OFF}}$ signal occurring simultaneously. In such case, the exclusive OR gates 476 and 478 would turn off causing the sealed AND gates 480 and 482 to turn off. The AND gate 484 would turn off which would turn off OR gate 470. If there was no system logic unbalance, LED 492 would be turned on. Also, AND gate 486 would turn off which would turn off the off time delay 490. After the appropriate time delay, AND gates 454 and 466 would turn off to illuminate the system fault lamp 434 through the gates 494, 428 and 430 and the output device 432. Also, the FAULT CIRCUIT A signal and the FAULT CIRCUIT B would go low when AND gates 454 and 466 turned off to prevent the operation of the ram.

Referring now to FIG. 3 at lines 78 and 90, there is shown two AND gates 454 and 466 for generating the FAULT CIRCUIT A signal and the FAULT CIRCUIT B signal. Assuming that no faults were detected by the Anti-Repeat Check System 1 and 2 circuit, the Valve Gate Check circuit, or the Valve Amplifiers Check circuits; all of the inputs to the AND gates 545 and 466 should be high. Thus, the FAULT CIRCUIT A signal and the FAULT CIRCUIT B signal should be high when no faults are detected. The FAULT CIRCUITS A and B signals are necessary for the operation of the press 10 as will hereinafter be described in detail.

To illustrate the operation of the System 1 clutch control circuit, first assume that the ram is at the top of its stroke or at 0°, the selector switch has been turned to the continuous mode, and the run buttons are not depressed.

Referring now to FIG. 1 lines 1–34, there is shown a System 1 Clutch Control for controlling the operation of the press in the continuous or single mode of operation. The System 1 Clutch Control circuit generates a ICR signal at the TRUE output of the AND gate 497. The ICR signal is necessary to engage a clutch to drive the ram 14 of the press 10, as will hereinafter be described in greater detail. Also assume that the motor is running forward and that the BEM signal is high. In such case, the OFF CHECK signal, the TOP STOP PUSH BUTTON signal, the 1MF signal, the A3 signal, the ALL RUN BUTTONS RELEASED signal, and the $\overline{\text{ICR}}$ signal should be high. The AND gate 502 will turn on placing a high signal on the sealed inputs of the sealed AND gates 504 and 506. The OR gate 500 will turn on providing another high input to the sealed AND gate 504. However, AND gate 504 will have one low input because the AND gate 498 has the low SINGLE OR CONTINUOUS signal applied to one of its inputs.

To intiate the downstroke of the ram in the continuous mode, the continuous preset button 260 (FIG. 2, line 63) is pushed causing the AND gate 520 and the delay timer 522 to turn on. In ten seconds, the NOT output of the delay timer 522 will go low and turn off the AND gate 520. The provision of the timer 522 requires that the run buttons be actuated within ten seconds of the actuation of the condition preset button.

The AND gate 520 will also turn on the OR gate 524 which will turn on the AND gate 526. Since the press is in the continuous mode, the CONTINUOUS (1) signal, and the CONDITIONED CONTINUOUS select signal should be high. Also, the $\overline{\text{CONTINUOUS PRESET PUSH BUTTON}}$ signal should be high when the preset push button is released. Thus, all of the input signals to the AND gate 526 are high immediately after the preset button is depressed.

The CONTINUOUS SIGNAL SYSTEM 2 from the AND gate 526 (2) is applied to the AND gate 530 along with the high output of AND gate 526. Thus, AND gate 530 will turn on which will turn on the exclusive OR gate 538 and provide the SINGLE OR CONTINUOUS signal to AND gates 497 and 498. Three of the inputs to the sealed AND gate 528 will go high, but the A2-B2 HOLDING CIRCUIT signal will remain low. Thus, AND gate 528 will not turn on until the A2-B2 HOLDING CIRCUIT signal goes high at 180° in the ram cycle.

Referring now to FIG. 4, line 11, when the SINGLE OR CONTINUOUS signal is applied to AND gate 498, the AND gate 498 will go high turning on the sealed AND gate 504. The output of the sealed AND gate 504, the AR1 signal, will go high turning on the OR gate 508. The output of the OR gate 508, the RUN BUTTON PERMISSIVE signal, goes high and is applied to an input of the AND gate 516. When the run buttons are actuated, the RO1 signal, the RO2 signal and the RUN BUTTONS CONDITIONED signal should be high turning on AND gate 516, and the TRUE output of the AND gate 516, the initiating signal, goes high turning on the OR gate 518. The TRUE output of the OR gate 518 goes high and is applied to an input of the AND gate 497. As previously described, a SINGLE or CONTINUOUS signal is supplied by the exclusive OR gate 538 to the AND gate 497, and the FAULT CIRCUIT A signal should be high if no faults have been detected. Since all of the inputs to the sealed AND gate 496 at FIG. 4 line 6 will be high at 0° in the ram cycle, and the high output of the AND gate 496 will turn on the OR gate 495 to produce a high TOP STOP signal. Thus all of the inputs to the AND gate 497 are high, and the 1CR signal goes high. A high 1CR signal is necessary to activate the ram 14.

As previously described, the System 2 Clutch Control circuit shown on FIG. 4, lines 62–97, is substantially identical to the System 1 Clutch Control circuit. When the press is placed in the continuous mode and the continuous preset button is depressed, and the run buttons are depressed within ten seconds thereafter, the System 2 Clutch Control circuit will produce the 2CR signal in the same manner as the system 1 clutch control circuit produced the 1CR signal. As will be hereinafter described in more detail, the production of the 1CR signal and the 2CR signal simultaneously is necessary to initiate a down stroke of the ram 14.

As the ram 14 proceeds through its cycle, the B.E.M. signal should go low at 180° turning off AND gate 498 and the AND gate 504. Also, the A3 signal should go low at 200° providing a backup signal to insure that the AND gate 504 turns off. The AND gate 504 cannot come back on until the AND gate 502 provides a high signal. The AND gate 502 will provide a high signal only when all of the run buttons are released and the 1CR signal is not being produced.

Referring now to FIG. 4, line 22, all of the inputs to the AND gate 514 should go high at 180° turning the AND gate 514 on to produce the high A2–B2 HOLDING CIRCUIT signal at the TRUE output thereof. As previously described, in the continuous mode, all of the inputs to the sealed AND gate 528 were high except for the sealed AND input. When the A2–B2 HOLDING CIRCUIT signal goes high, the AND gate 528 will turn on and the OR gate 532 will turn on. The TRUE output of OR gate 532 will provide a high input to the sealed AND gate 534. The 1CR signal and the output of AND gate 590 provide high inputs to gate 534, and the sealed input of gate 534 remembers the MOMENTARY CAM CHECK signal that occurred at 180°. Thus, the TRUE output of the sealed AND gate 534, the SUSTAINING signal, goes high and is applied to an input of the OR gate 518 to hold OR gate 518 on until a signal is received to stop the operation of the press, such as the TOP STOP signal.

Referring now to FIG. 4, lines 3–7, there is shown circuitry for generating a signal to stop the ram 14 at the top of the ram cycle. If the top stop push button 7PB (FIG. 2, line 47) is depressed, the TOP STOP PUSH BUTTON signal will go low turning off the AND gate 496. If the ram cycle is between 180° and 330°, when the top stop push button is released and the TOP STOP PUSH BUTTON signal goes high again, the sealed AND gate 496 will remain off because its sealed input has not been reset.

Even after AND gate 496 goes off, the AND gate 494 will hold the OR gate 495 on while the 1CR signal remains high. However, when the ram cycle reaches 330°, the A4 signal will go low turning off the AND gate 494 which will turn off the OR gate 495, and the TOP STOP signal will go low. When the top stop signal goes low, the AND gate 497 turns off, and the 1CR signal goes low which will stop the ram at the top of the ram stroke.

Assume now that the ram has been stopped in the continuous mode at some point in the upstroke, after 180° in the ram cycle. In this condition, the AND gate 504 at FIG. 4, line 10, has turned off and cannot be turned back on. However, in the continuous mode, the continuous condition signal will be applied to the OR gate 512 at FIG. 4, line 20, causing its TRUE output to remain high. The AR1 signal is now low, but the sealed input of the sealed AND gate 510 will "remember" the high AR1 signal until one of the other inputs to the sealed AND gate 510 goes low. Thus, the AND gate 510 produces a high TRUE output which is applied to an input of the sealed AND gate 506. The A2-B2 HOLDING CIRCUIT signal and the 1MF signal are applied to the inputs of the sealed AND gate 506, and these signals should remain high. When all of the run buttons are released and the ram is stopped, AND gate 502 should produce a high TRUE output, and the sealed AND gate 506 will turn on. The high TRUE output of the AND gate 506 will turn on the OR gate 508 causing the RUN BUTTONS PERMISSIVE signal to go high.

When the continous preset push button 260 shown at FIG. 2, line 63, is depressed, the continuous preset signal goes high turning on AND gate 520, OR gate 524, AND gate 530, and the exclusive OR gate 538, thereby, causing the continuous or single signal to go high for the time delay period of time delay 522. If the run buttons are again depressed within the time delay period of time delay 522, all of the inputs to the AND gate 516 will go high causing the initiating signal to go high turning on the OR gate 518. The TRUE output of the OR gate 518 goes high turning on the AND gate 547 and causing the 1CR signal to go high. In like manner, the 2CR signal goes high and the upstroke of the ram begins.

At 330° in the ram cycle, the A2-B2 HOLDING CIRCUIT signal will go low which will turn off the sealed AND gate 506 at FIG. 4, line 18. The TRUE output of the AND gate 506 will go low turning off the OR gate 508. The RUN BUTTONS PERMISSIVE signal will go low turning off the AND gate 516 to cause the initiating signal to go low. The low initiating signal will turn off the OR gate 518 as the other input of the OR gate 518 is also low, and AND gate 497 will turn off stopping the ram 14. Thus, when the ram is stopped during its upstroke in the continuous mode, depressing the preset buttons then run buttons will cause the ram to continue its upstroke to the top of the stroke where it will stop.

When the ram is stopped, the sustaining signal from the AND gate 534 goes low and will not go high again when the preset run buttons are depressed. When the ram stopped and the 1CR signal went low, the sealed AND gate 534 at FIG. 4, line 23, turned off. The sealed AND gate 534 cannot turn back on again until the MOMENTARY CAM CHECK signal is received at its sealed input. The momentary cam check signal occurs only at 180°. Thus, the sustaining signal will not go high again until the ram cycle reaches 180° again.

Summarizing the operation of the System 1 Clutch Control in the continuous mode, the sealed AND gate 504 generates an AR1 signal that drives the OR gate 508, the AND gate 516, the OR gate 518, and the AND gate 497 to produce the 1CR signal. The AR1 signal can be generated only to initiate a downstroke of the ram.

The sealed AND gate 506 at FIG. 4 line 18, will produce a TRUE high signal after the ram cycle has passed 180°. Thus, the AND gate 506 initiates an upstroke of the ram when the ram has been stopped in the middle of an upstroke when the preset and run buttons are depressed. However, the AND gate 506 will turn off at 330°, and the ram will stop at the top of its stroke. To start the ram again, the run buttons must be released and then the preset and run buttons must be depressed again so that AND gate 504 will initiate another downstroke.

The AND gate 534 located at FIG. 4, line 23, generates a SUSTAINING signal to enable the ram to run constantly in the continuous mode even after the run buttons have been released. The AND gate 534 will turn on only after the AND gate 504 has initiated a downstroke and the momentary cam check signal has gone high at 180° in the ram cycle. If for any reason the 1CR signal is lost, the AND gate 534 will turn off and will not come back on again until the operation of the ram has been initiated again by the AND gate 504 or the AND gates 504 and 506.

The ability to use the run buttons to bring the ram back to the top of the ram cycle is an important aspect of the present invention. If this feature of the present invention were absent, it would be necessary for the operator to use the inch buttons to bring the ram back to the top of the ram cycle after the ram had stopped in the upstroke. Because of AND gate 506 and its supporting circuitry, the run buttons may be used to initiate an upstroke. Thus, a supervisor may lock out the inch buttons so that the operator cannot operate the press 10 in the inch mode.

The system 1 clutch control circuit also implements the single mode of operation. When the press 10 is placed in the single mode, the SINGLE (1) signal and the single CONDITIONED SINGLE SELECT signals are received at the inputs of the AND gate 536 which is located at FIG. 4, line 30. The TRUE output of the AND gate 536 turns on the exclusive OR gate 538 which produces a high SINGLE OR CONTINUOUS signal. The SINGLE OR CONTINUOUS signal is applied to the AND gates 497 and 498. In the single mode, the AND gate 498, the OR gate 500 and the sealed AND gate 504 function exactly as described above with regard to the continuous mode. When the ram is stopped between 330° and 180° in the ram cycle, the AND gate 498 and the OR gate 500 turn on. When all of the run buttons are released, the AND gate 502 turns on, and all of the inputs to the AND gate 504 go high. The TRUE output of the AND gate 504, the AR1 signal, then goes high turning on the OR gate 508. The TRUE output of the OR gate 508, the RUN BUTTON PERMISSIVE signal then goes high.

At 180° in the ram cycle in the single mode, the AND gate 504 turns off and the AND gate 506 turns on. The AND gate 504 is turned off by the B.E.M. signal going low, and the AND gate 506 is turned on by the A2–B2 HOLDING CIRCUIT signal going high. The high A4 signal keeps OR gate 512 and the AND gates 510 and 506 on until the ram reaches 330° in the ram cycle.

With the OR gate 506 on, the OR gate 508 produces a high RUN BUTTONS PERMISSIVE signal in upstroke as in the continuous mode. If the run buttons are depressed, the initiating signal will turn OR gate 518 and the AND gate 497 on. As previously mentioned, the SINGLE OR CONTINUOUS signal provides a constantly high input to the AND gate 497 in the single mode. Thus, the run buttons alone may be used to initiate an upstroke. When the ram reaches 330° in the ram cycle, OR gate 512 will turn off in the single mode stopping the ram at the top of the ram stroke.

In the single mode, the run buttons may be released at 180° in the ram stroke and the ram will continue and stop at the top of the ram stroke. When the ram starts, the 1CR signal and the TRUE output of AND gate 590 go high providing two high inputs to AND gate 534. At 180° the MOMENTARY CAM CHECK signal goes high and the A2–B2 HOLDING CIRCUIT signal goes high turning on OR gate 532 and sealed AND gate 534 to provide a high SUSTAINING signal. The SUSTAINING signal will cause the ram to continue to operate until 330° in the ram cycle. At that period, the A2–B2 HOLDING CIRCUIT signal goes low turning off the OR gate 532 and the sealed AND gate 534 to produce a low sustaining signal, and the ram stops. In the single mode, the ram is always stopped at the top of the ram cycle.

As previously mentioned, the System 1 Clutch Control and the System 2 Clutch Control circuits are substantially similar and function in the same manner to produce the 1CR signal and the 2CR signal, respectively. Both the 1CR signal and the 2CR signal must be produced to operate the press in the single mode or the continuous mode.

In addition, the TRUE output of the AND gate 526 (2) of System 2 is connected to an input of the AND gate 530 of System 1. The TRUE output of the AND gate 526 is connected to an input of the AND gate 530 (2). In order for the AND gates 530 and 530 (2) to turn on, the outputs of the AND gates 526 and 526 (2) must both go high. Because of the above-described interconnection, it is necessary for both the AND gates 526 and 526 (2) to be functioning properly in order for either System 1 or System 2 to operate in the continuous mode. For the same reasons in the continuous mode, the SINGLE OR CONTINUOUS signal goes low when either time delay 522 or 522 (2) times out.

Referring now to FIG. 4, line 95, there is shown an OR gate 544 (2), an AND gate 542 (2), an output device 546 and a continuous preset lamp 540. When the 2CR signal goes high and the FLASHER signal goes high, the OR gate 544 (2) turns on and produces a high TRUE output. When the output of the AND gate 530 (2) goes high, the AND gate 542 (2) turns on and off in unison with the OR gate 544 (2). The TRUE output of the AND gate 542 (2) is applied through an output device 546 to illuminate the lamp 540 to indicate that the continuous preset button has been depressed. When the continuous preset button is depressed, lamp 540 will flash for a selected time period or until the ram begins operation. When the ram starts, the 2CR signal goes high and the lamp 540 is continuously illuminated.

Referring to FIG. 4, lines 89–97 and FIG. 3, lines 9–14, the TRUE outputs of the AND gates 536 (2) and 542 (2) are connected to the inputs of the OR gate 325. When the press is in the single mode, the TRUE output of AND gate 536 (2) will maintain the OR gate 325 in an "on" condition. When in the continuous mode, the TRUE output from AND gate 542 will turn the OR gate 325 on or off in unison with the lamp 540. The TRUE output of the OR gate 325 and the FAULT CIRCUIT A signal drives AND gate 323 whose TRUE output is connected to an input of AND gate 322 that controls the illumination of lamps 326 and 328. When the $\overline{\text{SUSTAINING SYSTEM 1}}$ signal is high, the FAULT CIRCUIT A signal is high, the RUN BUTTONS PERMISSIVE signal is high, and the output of AND gate 304 is high; the lamps 326 and 328 turn on and off in unison with OR gate 325. When the $\overline{\text{SUSTAINING SYSTEM 1}}$ signal is low, lamps 326 and 328 turn off.

The circuit controlling lamps 326 and 328 are an important aspect of the invention. These lamps 326 and 328 greatly facilitate the operator's understanding and operation of the press 10. When the ram is at the top of the ram stroke and in the continuous mode, the lamps 326 and 328 will flash to tell the operator that the preset button has been depressed, and the lamps will go off to indicate that time delay 522 or 522 (2) has timed out. If the run buttons have been depressed to start the ram in the continuous mode, the lamps 326 and 328 will go off to indicate when the operators can release the run buttons without stopping the ram. When the ram stops in the upstroke in the continuous mode, the lamps will remain off to indicate that the run buttons will not operate the press, will flash to indicate when the continuous preset button has been depressed, and will remain on while the run buttons are depressed and the ram returns to the top of the stroke. In the single mode, the lamps 326 and 328 will turn on to indicate the run buttons may be used to operate the press and will turn off to indicate that the run buttons may be released without stopping the press.

Referring now to FIG. 4, lines 35–60, there is shown a systems 1 and 2 solenoid valve output circuit. This circuit is operable to energize and deenergize a pair of clutch valve solenoids 572 and 584. When the clutch valve solenoids 572 and 584 are energized simultaneously, a clutch will be engaged and the ram will begin its ram cycle. If both of the clutch valve solenoids 572 and 584 are deenergized simultaneously the ram will stop operation. If either of the clutch valves 572 or 584 turns on or off without the other of the clutch valves operating in unison, the fluid pressure from the closed valve will be exhausted through the open valve and the ram will either stop or remain stopped. This valve structure is discussed in more detail in conjunction with FIG. 7.

Assuming now that the press is in the continuous or single mode, and that the 1CR and 2CR signals have been properly generated, the 1CR and 2CR signals will be applied to the exclusive OR gates 550, 552, 554 and 556. The TRUE outputs of these OR gates will go high turning on the AND gates 562, 564, 574 and 576, each of which has an input connected to the FAULT CIRCUIT A signal or the FAULT CIRCUIT B signal, to remain high at all times providing a fault is not detected. The TRUE outputs of the AND gates 562, 564, 574 and 576 turn on the amplifiers 566, 568, 578 and 580, respectively. The outputs of the amplifiers 566 and 568 energize the clutch valve solenoid 572, and the outputs of the amplifiers 578 and 580 energize the clutch valve solenoid 584.

The outputs of amplifiers 566 and 568, and the NOT outputs of the AND gates 562 and 564 are connected to an amplifier short detection system 570 that is built into the twin amplifier 558. If no short is detected, a NORMAL signal will appear at the normal output of the amplifier detection system 570. High signals appear at the "A" on output and the "B" on output of the amplifier short detection system 570 in response to the outputs of the amplifiers 566 and 568. The outputs of the amplifiers 578 and 580, and the NOT outputs of the AND gates 574 and 576 are connected to the amplifier short detection system 582 that checks for a short in the twin amplifier 560. The amplifier 560 is identical to the amplifier 558 and functions in the same manner.

The inputs of the AND gate 586 and the OR gate 588 are connected to each of the signals "A" ON, "B" ON, "C" ON and "D" ON. The TRUE and NOT outputs of the AND gate 586 and the OR gate 588 are checked to insure that the output signals are logical in the manner previously described in conjunction with the valve amplifiers check circuits shown on FIG. 3, lines 84–96.

When, the TRUE output of the AND gate 586, the ALL AMPS ON signal, is high, the A2-B2 CIRCUIT CHECK signal is high, and the APS signal is high, the TRUE outputs of the AND gates 590 and 592 are high and are applied to the AND gates 534 and 534(2). In this circuit configuration, the ALL AMPS ON signal is necessary for the SUSTAINING signal to be generated at the TRUE outputs of the sealed AND gates 534 and 534(2).

Referring now to FIG. 4, lines 40 and 55, there is shown two AND gates 546 and 548. The INCH (1) SELECT SWITCH signal, the JO1 signal, the INCH BUTTONS CONDITIONED signal and the JO2 signal are applied to the AND gate 506, while the JO1 signal, the JO2 signal, the INCH BUTTONS CONDITIONED signal and the INCH (2) select switch signal are applied to the AND gate 548. When the press is operating in the inch mode and all of the inch buttons are depressed in concert, all of the aforementioned signals will go high turning on both of the AND gates 546 and 548. The TRUE outputs of the AND gates 546 and 548 will then turn on the exclusive OR gates 550, 552, 554 and 556. The outputs of these OR gates will then go high turning on the twin amplifiers 558 and 560 to cause the clutch valve solenoids 572 and 584 to be energized in the manner previously described with regard to the single and continuous modes.

When the inch buttons are released, the AND gates 546 and 548 turn off causing the amplifier OR gates 550, 552, 554 and 556 to turn off. The twin amplifiers 558 and 560 then turn off deenergizing the clutch valve solenoids 572 and 584.

Referring now to FIG. 7, there is shown a diagram of a valve arrangement used in the present invention. A fluid pressure supply 600 supplies pressurized fluid to a pair of three-way valves 602 and 604. The valves 602 and 604 control the flow of fluid pressure to the clutch 606. A failure detector 608 senses the fluid pressure from the valve 602 and 604 to detect malfunctions. The solenoid 572 is mechanically connected to actuate valve 602, and the solenoid 584 is mechanically connected to actuate valve 604.

In operation, the three-way valves 602 and 604 are in a normally closed position as shown in FIG. 7. In this position, the clutch 606 is not pressurized. When the solenoids 572 and 584 are energized, the valves 602 and 604 are actuated to an open position to supply fluid pressure to the clutch 606. In response, the clutch 606 engages causing the ram 14 (FIG. 5) to operate through the ram cycle.

If either of the valves, such as valve 602, moves to an open position while the other valve, such as 604, remains in the deactuated closed position, such as shown in FIG. 7, the valve 602 will supply fluid pressure to the valve 604 where the fluid pressure will be exhausted to atmosphere. In this manner, the fluid pressure supplied to the clutch 606 will not be sufficient to cause the clutch to engage to operate the ram.

Also, the detector 608 is operable to sense fluid pressure to detect the condition of one of the valves 602 or 604 being opened and the other valve being closed. If such condition exists, the sensor 608, will supply fluid pressure to both valves 602 and 604 to cause the valves to move back to the closed position shown in FIG. 7.

Although a particular embodiment has been disclosed in the above Detailed Description, it will be understood that the invention is capable of numerous rearrangements, modifications and substitutions of parts without departing from the spirit of the invention.

I claim:

1. A control system for a machine having a drive system, a mechanism selectively driven by the drive system, and selectively engageable clutch for mechanically connecting the drive system to the mechanism, said control systems comprising:
   input means for producing a plurality of command signals;
   a first clutch control system responsive to the command signals for selectively producing a first clutch engage signal;
   a second clutch control system responsive to the command signals for selectively producing a second clutch engage signal; and
   output means responsive to the simultaneous presence of the first and second clutch engage signals for engaging the clutch,
   wherein said output means comprises:
   first gate means for producing first gate signals in response to the first clutch engage signal;
   second gate means for producing second gate signals in response to the second clutch engage signal;
   gate check means responsive to the first and second gate signals for producing a false signal and responce to the presence of a predetermined combination of the first and second gate signals;
   said first and second clutch control systems being disabled by the fault signal to prevent the production of the first and second clutch engage signal; and
   output means responsive to the first and second gate signals for engaging the clutch.

2. The control system of claim 1 wherein said predetermined combination comprises at least one of the gate signals but less than all of the gate signals.

3. A control system for a machine having a drive system, a mechanism selectively driven by the drive system, and a clutch for selectively engaging to mechanically connect the drive system to the mechanism, said control system comprising:

input means for producing a plurality of command signals;

at least one clutch control system responsive to the command signals for selectively producing at least one clutch engage signal;

a first circuit responsive to the clutch engage signal for producing first energizing signals;

a second circuit responsive to the clutch engage signals for producing second energizing signals;

a first valve system for closing a first valve in response to the first energizing signal;

a second valve system for closing a second valve in response to the second energizing signal; and said clutch being connected to said and first and second valve systems and being operable to engage in response to the simultaneous closing of said first and second valves.

4. The control system of claim 3 further comprising amplifier gate check means responsive to the energizing signals for producing a fault signal in response to the presence of a predetermined combination of energizing signals; said clutch control system being disabled by said fault signal to prevent the production of the clutch engage signals.

5. The control system of claim 4 wherein said predetermined combination comprises at least one of the energizing signals but less than all of the energizing signals.

6. A control for a machine having a drive system, a mechanism selectively driven by the drive system, and a clutch for selectively engaging to mechanically connect the drive system to the mechanism, said control system comprising:

input means for producing a plurality of command signals;

at least one clutch control system responsive to the command signals for selectively producing a clutch engage signal;

at least one amplifier circuit responsive to the clutch engage signal for producing energizing signals, said amplifier circuit including first and second amplifiers, each of said amplifiers for producing an energizing signal in response to the presence of the clutch engage signal; and at least one actuator means responsive to the energizing signals for engaging the clutch in response to the simultaneous presence of both energizing signals to operate the ram, whereby the failure of one of said amplifiers will not cause the clutch to engage.

7. The control system of claim 6 further comprising amplifier check means responsive to the energizing signals for producing a fault signal in response to a predetermined combination of energizing signals.

8. The control system of claim 7 wherein said predetermined combination of energizing signals comprises only one of the energizing signals.

9. A control system for a mechanical press having a drive system, a reciprocating ram driven by the drive system and operating through a ram cycle from 0° to 360° where 0° is defined as the top of the ram stroke and 180° is defined as the bottom of the ram stroke, a clutch for selectively engaging to mechanically connect the drive system to the ram, and first and second valves in a fluid pressure system for being actuated to engage the clutch; said control system comprising:

input means for producing a plurality of command signals;

a first clutch control system responsive to the command signals for selectively producing a first clutch engage signal;

a second clutch control system responsive to the command signals for selectively producing a second clutch engage signal;

a first amplifier circuit responsive to the simultaneous production of the first and second clutch engage signals for producing first energizing signals;

a second amplifier circuit responsive to the simultaneous production of the first and second clutch engage signals for producing second energizing signals;

first actuating means responsive to the first energizing signals to actuate the first clutch valve; and second actuating means responsive to the second energizing signals to actuate the second clutch valve; whereby, the first and second clutch valves are simultaneously actuated to engage the clutch to operate the ram.

10. The control system as set forth in claim 9 further comprising:

detection means for detecting the presence of only one clutch engage signal and for producing a fault signal upon detection of only one engage signal; and said first and second clutch control systems being disabled by the fault signal to prevent the production of the first and second clutch engage signals.

11. The control system of claim 9 wherein said first and second amplifier circuits comprise:

a first gate circuit responsive to the first and second clutch engage signals for producing first gate signals;

a second gate circuit responsive to the first and second clutch engage signals for producing second gate signals;

a first twin amplifier responsive to said first gate signals for producing the first energizing signals; and a second twin amplifier responsive to said second gate signals for producing the second energizing signals.

12. The control system of claim 11 further comprising:

gate check means responsive to said first and second gate signals for detecting improper gate signals and for producing a fault signal in response to the presence of at least one of the gate signals but less than all of the gate signals; and said first and second clutch control system being disabled by the fault signal to prevent the production of the first and second clutch engage signals.

13. The control system as set forth in claim 9 wherein said input means comprises:

first sub-input means for producing command signals including a plurality of run signals;

run button check means responsive to said run signals for producing a run button conditioned signal in response to a predetermined combination of run signals; and said first and second clutch control systems being responsive to the command signals, the run signals and the run button conditioned signal for selectively producing the first and second energizing signals.

14. The control system of claim 13 wherein said first and second clutch control systems comprise:

a first sub-clutch control circuit responsive to the command signals and the run button conditioned signal for selectively producing a first run button permissive signal;

a first initiating means responsive to the run signals and the run button permissive signals for selectively producing the first clutch engage signal;

a second sub-clutch control circuit responsive to the command signals and the run button conditioned signal for selectively producing a second run button permissive signal; and a second initiating means responsive to the run signals and the run button permissive signal for selectively producing the second clutch engage signal.

15. The control system of claim 14 further comprising:

a run button permissive check means responsive to the first and second run button permissive signals for producing a fault signal in response to the presence of only one run button permissive signal; whereby a fault signal is produced when one of the run button permissive signals is produced in the absence of the other run button permissive signal; and said first and second initiating means being disabled by the fault signal to prevent the production of the first and second clutch engage signals.

16. The control system of claim 9 further comprising: amplifier check means for detecting improper operation of said first and second amplifier circuits and for producing a fault signal when improper operation of said first and second amplifier circuits is detected, whereby said amplifier check means produces a fault signal when one of said first or second amplifier circuits produces an energizing signal without the production of all of the first and second energizing signals; and said first and second clutch control systems being disabled by the fault signal to prevent the production of the first and second clutch engage signals.

17. The control system of claim 9 wherein the first and second amplifier circuits comprise:

a first gate circuit responsive to the first and second clutch engage signals for producing first amplifier gate signals;

a first twin amplifier having a pair of AND gates responsive to said first gate signals for producing first AND signals;

said first twin amplifier having a first pair of amplifiers responsive to the first AND signals for producing the first energizing signals;

a first amplifier short detection system responsive to the first AND signals and to the first energizing signals for detecting shorts in said first twin amplifier, for producing an A-on signal and a B-on signal in response to the first energizing signals, and for producing a normal signal when the first twin amplifier is functioning properly;

a second gate circuit responsive to the first and second clutch engage signals for producing second gate signals;

a second twin amplifier having a pair of AND gates responsive to said second gate signals for producing second AND signals;

said second twin amplifier having a second pair of amplifiers responsive to the second AND signals for producing the second energizing signals; and a second amplifier short detection system responsive to the second AND signals and to the second energizing signals for detecting shorts in said second twin amplifier, for producing a C-on signal and a D-on signal in response to the second energizing signals, and for producing a normal signal when said second twin amplifier is functioning properly.

18. The control system of claim 17 further comprising:

a twin amplifier check means responsive to the A-on, B-on, C-on and D-on signals for producing a fault signal in response to the presence of a predetermined combination of the A-on, B-on, C-on and D-on signals; and said first and second clutch control systems being disabled by said fault signal to prevent the production of said first and second clutch engage signals.

19. The control system of claim 18 wherein the predetermined combination comprises at least one but less than all of the A-on, B-on, C-on and D-on signals.

20. A control system for a mechanical press having a drive system, a reciprocating ram driven by the drive system and operating through a ram cycle from 0° to 360° where 0° is defined as the top of the ram stroke and 180° is defined as the bottom of the ram stroke, and a clutch for engaging to mechanically connect the drive system to the ram, said control system comprising:

run buttons for being depressed to produce run signals;

sensor means connected to the ram for producing a first position signal when the ram is positioned for a downstroke and for producing a second position signal when the ram is positioned for an upstroke;

downstroke means responsive to the run signals and the first position signal for selectively producing an initiating signal to initiate a downstroke of the ram;

upstroke means responsive to the run signals and the second position signal for selectively producing the initiating signal to initiate an upstroke of the ram; and output means responsive to said initiating signal for engaging the clutch to operate the ram; whereby, said downstroke means is operable to initiate and maintain a downstroke so long as the run buttons are depressed and said upstroke means is operable to initiate and maintain an upstroke of the ram so long as the run buttons are depressed.

21. The control system of claim 20 wherein the sensor means produces the first position signal when the ram is between 330° and 180° in the ram cycle and produces the second position signal when the ram is between 180° and 330° in the ram cycle.

22. A control system for a mechanical press having a drive system, a reciprocating ram driven by the drive system and operating through a ram cycle from 0° to 360° where 0° is defined as the top of the ram stroke and 180° is defined as the bottom of the ram stroke, and a clutch for engaging to mechanically connect the drive system to the ram, said control system comprising:

run buttons for being depressed to produce a plurality of run signals and for being released to produce a plurality of no-run signals;

sensor means communicating with the ram for producing first position signals when the ram is positioned between about the top of the ram stroke to about 180° in the ram cycle and for producing a second position signal when the ram is positioned between about 180° and about the top of the ram stroke;

a gate responsive to the no-run signals for producing an all run buttons released signal when the run buttons are in a released condition;

downstroke means being initially enabled by the all run buttons released signal and being responsive to the first position signal for selectively producing an anti-repeat signal;

upstroke means being initially enabled by the anti-repeat signal and the all run buttons released signal for selectively producing an upstroke signal in response to the second position signal;

initiating means responsive to the run signals, the anti-repeat signal and the upstroke signal for selectively producing an initiating signal when the run buttons are depressed; and output means responsive to the initiating signal for selectively engaging the clutch to operate the ram.

23. A control system for use in a press having a reciprocating ram operating through a ram cycle from 0° to 360° comprising:

a plurality of rotary cam limit switches in communication with the ram for producing a plurality of position signals corresponding to the positions of the ram in the ram cycle;

check means receiving the position signals for producing a cam check signal in response to preselected combinations of the position signal; and output means responsive to said cam check signal for selectively stopping the operation of the ram;

said check means comprising:

at least two OR gates having a plurality of inputs for receiving the position signals and having an output on each of said OR gates; and an exclusive OR gate having two inputs connected to the outputs of said OR gates and having an output; and a gate having an input connected to the output of said exclusive OR gates for producing the cam check signal.

24. A control system for use in a press having a reciprocating ram operable in at least a continuous mode through a ram cycle from 0° to 360° where 0° is defined as the top of the ram stroke and 180° is defined as the bottom of the ram stroke, said control system comprising:

a plurality of rotary cam limit switches for generating a plurality of position signals corresponding to the position of the ram in the ram cycle;

check means for receiving the position signals and for producing one momentary cam check signal in every ram cycle in response to a predetermined sequence of position signals;

a holding circuit for being initially enabled by the momentary cam check signal to produce a sustaining signal; and output means responsive to the sustaining signal to operate the ram in the continuous mode.

25. The control system of claim 24 wherein said check means produces the momentary ram check signal when the ram is positioned at about 180° in the ram cycle so that if the ram stops in an upstroke, the holding circuit will be enabled only when the ram continues through the ram cycle to a position of about 180°.

26. The control system of claim 24 wherein said check means comprises:

a first OR gate having a plurality of inputs and a single output, one of said inputs for receiving at least one position signal;

a single shot having an input connected to the output of the first OR gate and having an output;

a first AND gate having a plurality of inputs connected to receive at least one position signal on each input and having an inverted output;

a second OR gate having two inputs and an output, one input being connected to the output of said single slot;

a second AND gate having two inputs and an output, one input being connected to the inverted output of said first AND gate and the other input being connected to the output of the second OR gate;

said first and second OR gates having an input connected to the output of the second AND gate; and a third AND gate having at least two inputs and an output, one of the inputs being connected to the output of the second AND gate and the other input being connected to the output of the single slot, the momentary cam check signal being produced at the output of said third AND gate.

27. A control system for a mechanical press having a drive, a reciprocating ram for being selectively driven by the drive through a ram cycle said control system comprising:

first and second command buttons for being depressed and released;

first and second contacts being mechanically connected to said first and second command buttons, respectively, for opening in response to said command buttons being depressed and for closing in response to said command buttons being released;

third and fourth contacts being mechanically connected to said first and second command buttons, respectively, for closing in response to said command buttons being depressed and for opening in response to said command buttons being released;

a first input electrically interconnected with said first and second contacts for producing a high TRUE signal and a low NOT signal when said first and second contacts are closed and for producing a low TRUE signal and a high NOT signal when said first and second contacts are opened;

a second input electrically interconnected with said third and fourth contacts for producing a high TRUE signal and a low NOT signal when said third and fourth contacts are closed and for producing a low TRUE signal and a high NOT signal when said third and fourth contacts are opened;

a command check circuit for producing a conditioned command button signal in response to a high NOT signal and a low TRUE signal from said first input and a high TRUE signal and a low NOT signal from said second input; and a ram control circuit for producing an on-signal to cause the ram to be driven through the ram cycle by the drive in response to at least the conditioned command button signal.

28. A mode selector for a mechanical press having a drive and a reciprocating ram for being selectively driven by the drive in at least two operating modes through a ram cycle, said mode selector comprising:

a selector switch having at least first and second operating mode settings;

a first input for producing at least one input signal when the selector switch is in the first setting;

a second input for producing at least one input signal when the selector switch is in the second setting;

a select switch check circuit for producing a high conditioned first mode signal in response to the input signal from said first input, for producing a high conditioned second mode signal in response to the input signal from said second input, and for producing a low conditioned first mode signal and a low conditioned second mode signal in response to the concurrent production of input signals from both first and second inputs; and a ram control circuit for operating the ram in the first operating mode in response to at least the high conditioned first mode signal and for operating the ram in the second operating mode in response to at least the high conditioned second mode signal.

29. The mode selector of claim 28 wherein said select switch check circuit produces a fault signal in response to the concurrent production of the input signals from both said first and second inputs.

30. A control system for use in a mechanical press having a drive system and a reciprocating ram selectively driven by the drive system through a ram cycle, said control system comprising:

run buttons for being depressed to produce run signals and for being released to terminate the run signals;

a ram control circuit responsive at least to the run signals for selectively producing a sustaining signal to operate the ram when the run buttons are in a released condition; and an indicator for producing an indicating signal in response to the sustaining signal to indicate that the ram will operate through the ram cycle with the run buttons in a released condition.

31. In a mechanical press having a drive system, a reciprocating ram selectively driven by the drive system in at least a continuous mode of operation, a continuous preset button, and a pair of run buttons, said press being placed in the continuouts mode by actuating the continuous preset button and subsequently actuating the run buttons within a first selected period after the continuous preset button is actuated and maintaining the run buttons in the actuated condition for a second selected period, the improvement comprising:

an indicator for producing first, second and third indicator signals;

a first means for energizing said indicator to produce the first indicator signal when the continuous preset button is actuated;

a second means for energizing said indicator to produce the second indicator signal when the run buttons are actuated within the first selected period after the continuous preset button is actuated; and a third means for energizing said indicator to produce the third indicator signal when the press is placed in the continuous mode.

32. A control system for use in a mechanical press having a drive system and a reciprocating ram selectively driven by the drive system through a ram cycle, comprising:

run buttons for being depressed to produce run signals and for being released to terminate the run signals;

a preset button for being depressed to produce a preset signal for a preselected time period;

enabling means for producing a run buttons permissive signal in response to at least the termination of the run signals;

initiating means responsive to the run buttons permissive signal and the run signals for producing an initiating signal;

sustaining means responsive to the preset signal and the run signals for producing a sustaining signal;

output means for producing an operating signal in response to the initiating signal to operate the ram when the run buttons are in a depressed condition and for producing the operating signal in response to the sustaining signal to operate the ram when the run buttons are in a released condition; and indicator means for producing a first indicator signal in response to the preset signal to indicate that the preset button has been depressed, for producing a second indicator signal in response to the run button permissive signal to indicate that the initiating means will operate the ram in response to the run signals, for producing the second indicator signal in response to the operating signal and the absence of the sustaining signal to indicate that the ram will stop if the run buttons are released, for producing a third indicator signal in response to the sustaining signal to indicate that the ram will operate with the run buttons in a released condition, and for producing the third indicator signal in response to the absence of the run button permissive signal to indicate that the initiating means is disabled to prevent the production of the initiating signal and to indicate that the run buttons are inoperable to operate the ram.

33. A method for controlling a mechanical press having a drive system and a reciprocating ram selectively driven by the drive system and operating through a ram cycle comprising:

producing a plurality of command signals corresponding to information inputs from an operator controlling the mechanical press;

responding to the command signals and producing first and second clutch engaged signals when the information input from the operator corresponds to an instruction to operate the ram;

responding to the simultaneous production of the first and second clutch engage signals causing the ram to begin operation through the ram cycle, whereby producing only one clutch engage signal does not cause the ram to operate;

responding to the presence of the first clutch engage signal on the absence of the second clutch engage signal to produce a fault signal;

responding to the second clutch engage signal in the absence of the first clutch engage signal to produce the fault signal; and producing an indicator signal perceivable by the operator of the press to indicate the presence of the fault signal.

34. A method for controlling a mechanical press having a drive system and a reciprocating ram selectively driven by the drive system, comprising:

producing a plurality of command signals corresponding to information inputs from an operator of the mechanical press;

producing at least one clutch engage signal in response to a predetermined combination of command signals;

responding to the clutch engage signal to produce first and second energizing signal;

responding to the simultaneous-only presence of the first and second energizing signals causing the drive system to mechanically engage the reciprocating ram to drive the ram through the ram cycle.

35. The method as set forth in claim 34 further comprising:

responding to the first energizing signal in the absence of the second energizing signal to produce a fault signal;

responding to the second energizing signal in the absence of the first energizing signal to produce the fault signal;

stopping the ram in response to the presence of the fault signal; and producing an indicator signal perceivable by the operator to indicate the presence of a fault signal.

36. A method for controlling a mechanical press having a drive system, a reciprocating ram driven by the drive system and operating through a ram cycle from 0° to 360° where 0° is defined as the top of the ram stroke and 180° is defined as the bottom of the ram stroke, a clutch for selectively engaging to mechanically connect the drive system to the ram, and first and second valves in a fluid pressure system for being actuated to engage the clutch; said method comprising:

producing a plurality of command signals corresponding to information input from an operator of the mechanical press;

responding to the command signals for producing first and second clutch engage signals;

responding to the simultaneous production of the first and second clutch engage signals for producing first energizing signals;

responding to the simultaneous production of the first and second clutch engage signals for producing second energizing signals;

actuating the first clutch valve in response to the presence of the first energizing signal; and actuating the second clutch valve in response to the second energizing signal; whereby, the first and second clutch valves are simultaneously actuated to engage the clutch to operate the ram in response to information input from the operator.

37. The method of claim 36 further comprising:

detecting the presence of only one clutch engage signal and producing a fault signal in response thereto; and disabling the mechanical press to prevent the operation of the ram in response to the presence of a fault signal.

38. The method of claim 36 further comprising:

responding to a preselected combination of command signals indicating a malfunction to produce a fault signal;

responding to a preselected combination of clutch engage signals indicating a malfunction to produce the fault signal;

responding to a preselected combination of energizing signals indicating a malfunction to produce the fault signal; and disabling the mechanical press to prevent the operation of the ram in response to the presence of the fault signal.

39. A method for controlling a mechanical press having a drive system, a reciprocating ram driven by the drive system and operating through a ram cycle from 0° to 360° where 0° is defined as the top of the ram stroke and 180° is defined as the bottom of the ram stroke and run buttons for controlling the operation of the ram, said method comprising:

actuating the run buttons to produce run signals for controlling the operation of the ram;

sensing the position of the ram and producing a first position signal when the ram is positioned for a downstroke and producing a second position signal when the ram is positioned for an upstroke;

responding to the run signals and to the first position signal to produce an initiating signal for initiating a downstroke of the ram;

responding to the run signals and to the second position signal for producing the initiating signal to initiate an upstroke of the ram; and causing the drive system to drive the reciprocating ram in response to the initiating signal.

40. The method as set forth in claim 39 wherein the first position signal is produced when the ram is between 330° and 180° in the ram cycle, and the second position signal is produced when the ram is between 180° and 330° in the ram cycle.

41. A method for operating a mechanical press and for indicating to the operator of a mechanical press when run buttons of the mechanical press may be released without stopping a reciprocating ram from operating, said method comprising:

depressing the run buttons to produce run signals for controlling the operation of the ram;

responding at least to the run signals to selectively produce a sustaining signal to operate the reciprocating ram when the run buttons are in a released condition; and responding to the sustaining signal to produce an indicating signal receivable by the operator of the mechanical press to indicate that the ram will operate with the run buttons in a released condition.

42. A method for controlling the operation of a mechanical press having run buttons and preset buttons for controlling a reciprocating ram selectively driven by a drive system through a ram cycle, comprising:

producing a preset signal for a preselected time period in response to the preset button being depressed;

producing run signal to indicate that run buttons have been depressed and terminating the run signals to indicate that the run buttons are in a released condition;

producing a run buttons permissive signal in response to at least the termination of the run signals so that the run buttons are operable to control the reciprocating ram of the mechanical press;

producing a sustaining signal in response to the preset signal and the run signals to sustain the operation of the mechanical press when the run buttons are released;

producing an operating signal in response to the initiating signal to operate the ram when the run buttons are in a depressed condition;

producing the operating signal in response to the sustaining signal to operate the ram when the run buttons are in a released condition;

producing a first indicator signal in response to the preset signal to indicate that the preset button has been depressed;

producing a second indicator signal in response to the run button permissive signal to indicate that the initiating means will operate the ram in response to the run signals;

producing the second indicator signal in response to the operating signal and the absence of the sustaining signal to indicate that the ram will stop if the run buttons are released;

producing a third indicator signal in response to the sustaining signal to indicate that the ram will operate with the run buttons in a released condition; and producing the third indicator signal in response to the absence of the run button permissive signal to indicate that the run buttons are inoperable to operate the ram of the mechanical press.

* * * * *

UNITED STATES PATENT AND TRADEMARK OFFICE
CERTIFICATE OF CORRECTION

PATENT NO. : 4,211,098
DATED : July 8, 1980
INVENTOR(S) : Kurt K. Luenser

It is certified that error appears in the above-identified patent and that said Letters Patent are hereby corrected as shown below:

Col. 7, line 38, "abovedescribed" should be --above-described--.
Col. 10, line 38, "circuit" should be --contact--;
       line 45, "circuit" should be --contact--.
Col. 13, line 60, "NOR" should be --NOT--.
Col. 18, line 24, "System 2." should be --System 1.--.
Col. 19, line 56, "ALL AMPS ON" should be --ALL AMPS ON--.
Col. 26, line 4, "ICR" should be --1CR--;
       line 25, "TURE" should be --TRUE--;
       line 31, "check" should be --CHECK--.
Col. 27, line 5, "gate" should be --gates--;
       line 50, "Not" should be --NOT--.
Col. 28, line 12, "OR gate which" should be --OR gate 436 which--;
       line 13, "422" should be --442--.

UNITED STATES PATENT AND TRADEMARK OFFICE
CERTIFICATE OF CORRECTION

PATENT NO. : 4,211,098  
DATED : July 8, 1980  
INVENTOR(S) : Kurt K. Luenser

It is certified that error appears in the above—identified patent and that said Letters Patent are hereby corrected as shown below:

Col. 29, line 14, "CIRCUITS" should be --CIRCUIT--;
        line 25, "ICR" should be --1CR--;
        line 26, "ICR" should be --1CR--; and
        line 33, "$\overline{ICR}$" should be --$\overline{1CR}$--.

Signed and Sealed this

Fourth Day of November 1980

[SEAL]

Attest:

SIDNEY A. DIAMOND

Attesting Officer      Commissioner of Patents and Trademarks